United States Patent
Iwata et al.

(10) Patent No.: US 12,021,658 B2
(45) Date of Patent: Jun. 25, 2024

(54) SWITCH DEVICE, IN-VEHICLE COMMUNICATION SYSTEM, AND COMMUNICATION METHOD

(71) Applicants: Sumitomo Electric Industries, Ltd., Osaka (JP); Sumitomo Wiring Systems, Ltd., Yokkaichi (JP); Autonetworks Technologies, Ltd., Yokkaichi (JP); Toyota Jidosha Kabushiki Kaisha, Toyota (JP)

(72) Inventors: Akihito Iwata, Osaka (JP); Tatsuya Izumi, Osaka (JP); Hirofumi Urayama, Osaka (JP); Tadashi Matsumoto, Yokkaichi (JP); Hideki Maeda, Yokkaichi (JP); Darmawan Go, Yokkaichi (JP); Takeshi Hagihara, Yokkaichi (JP); Masashi Amesara, Toyota (JP); Hisashi Furukawa, Toyota (JP); Shu Ishizuka, Toyota (JP); Hideki Goto, Toyota (JP)

(73) Assignees: Sumitomo Electric Industries, Ltd., Osaka (JP); Sumitomo Wiring Systems, Ltd., Yokkaichi (JP); Autonetworks Technologies, Ltd., Yokkaichi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/911,654

(22) PCT Filed: Feb. 2, 2021

(86) PCT No.: PCT/JP2021/003774
§ 371 (c)(1),
(2) Date: Sep. 15, 2022

(87) PCT Pub. No.: WO2021/186926
PCT Pub. Date: Sep. 23, 2021

(65) Prior Publication Data
US 2023/0142079 A1 May 11, 2023

(30) Foreign Application Priority Data

Mar. 16, 2020 (JP) .................................. 2020-044884

(51) Int. Cl.
*H04L 12/46* (2006.01)
*B60R 16/023* (2006.01)

(52) U.S. Cl.
CPC ........ *H04L 12/4645* (2013.01); *B60R 16/023* (2013.01)

(58) Field of Classification Search
CPC ............ H04L 12/4645; H04L 12/4641; H04L 2012/40273; B60R 16/023
See application file for complete search history.

(56) References Cited

U.S. PATENT DOCUMENTS 7,636,320 B1 * 12/2009 Taylor ................. H04L 41/0631
370/254
7,899,048 B1    3/2011 Walker et al.
(Continued)

FOREIGN PATENT DOCUMENTS

JP    2000-183936 A    6/2000
JP    2008-227695 A    9/2008
(Continued)

OTHER PUBLICATIONS

Cisco Systems, Inc., "Cisco Small Business 300 Series Managed Switch Administration Guide Release 1.3.5", Administration: Diagnostics, 2011, pp. 67-69, 79-81 (15 pages including English Translation).

(Continued)

*Primary Examiner* — Mohamed A. Wasel
(74) *Attorney, Agent, or Firm* — XSENSUS LLP

(57) ABSTRACT

A switch device includes: a plurality of communication ports; a switch unit configured to relay a frame, which has been transmitted from a function unit and to which information including an ID of a VLAN and priority information is added, to another function unit via a communication port, according to the priority information; and a duplication unit (Continued)

configured to, when the diagnosis device is connected to another switch device, duplicate the frame to be relayed via a designated communication port, thereby generating a duplicate frame for diagnosis. The duplication unit is able to set the priority information to be added to the duplicate frame for diagnosis, separately from the priority information to be added to the frame as an original. The switch unit outputs the duplicate frame for diagnosis, from a communication port corresponding to the other switch device, according to the priority information set by the duplication unit.

14 Claims, 12 Drawing Sheets

(56) References Cited

U.S. PATENT DOCUMENTS

| | | | | |
|---|---|---|---|---|
| 8,520,540 | B1* | 8/2013 | Foschiano | H04L 43/106 370/252 |
| 2008/0304423 | A1* | 12/2008 | Chuang | H04L 12/4666 370/253 |
| 2014/0016647 | A1 | 1/2014 | Yoshida et al. | |
| 2016/0173417 | A1 | 6/2016 | Maeda et al. | |
| 2017/0118573 | A1* | 4/2017 | Yae | H04W 4/40 |
| 2019/0158363 | A1* | 5/2019 | Zhu | H04L 41/142 |
| 2019/0222438 | A1 | 7/2019 | Kaku et al. | |
| 2019/0280989 | A1 | 9/2019 | Itagawa et al. | |
| 2020/0394853 | A1* | 12/2020 | Jung | H04L 43/0864 |
| 2021/0258258 | A1 | 8/2021 | Takagi et al. | |

FOREIGN PATENT DOCUMENTS

| | | | |
|---|---|---|---|
| JP | 2009-33577 | A | 2/2009 |
| JP | 2016-116024 | A | 6/2016 |
| JP | 2017-216613 | A | 12/2017 |
| JP | 2018-107584 | A | 7/2018 |
| JP | 2019-125884 | A | 7/2019 |
| JP | 2019-161349 | A | 9/2019 |
| JP | 2019-176255 | A | 10/2019 |
| WO | 2012/133060 | A1 | 10/2012 |
| WO | 2019/240034 | A1 | 12/2019 |

OTHER PUBLICATIONS

Office Action dated Oct. 3, 2023 in Japanese Patent Application No. 2020-044884, 10 pages.

Mitsuhiro Kitani, et al., "Development of Data Communication Method In-Vehicle Network for Automated Driving", IPSJ SIG Technical Report, Information Processing Society of Japan, Jan. 21, 2016, 8 pages. (with English Abstract).

* cited by examiner

FIG. 2

| DEVICE | VLAN ID | MAC ADDRESS | IP ADDRESS |
|---|---|---|---|
| IN-VEHICLE COMMUNICATION DEVICE 111A | 222 | MAC-A | IP-A |
| IN-VEHICLE COMMUNICATION DEVICE 111B | 111 | MAC-B | IP-B |
| IN-VEHICLE COMMUNICATION DEVICE 111C | 111 | MAC-C | IP-C |
| IN-VEHICLE COMMUNICATION DEVICE 111D | 111,222 | MAC-D | IP-D |
| DIAGNOSIS DEVICE 201 | 222 | MAC-E | IP-E |
| SWITCH DEVICE 101A | 111,222 | MAC-F | IP-F |
| SWITCH DEVICE 101B | 111,222 | MAC-G | IP-G |

SWITCH DEVICE, IN-VEHICLE COMMUNICATION SYSTEM, AND COMMUNICATION METHOD

CROSS-REFERENCE TO RELATED APPLICATIONS

The present application is based on PCT/JP2021/003774, filed on Feb. 2, 2021, which claims priority on Japanese Patent Application No. 2020-044884 filed on Mar. 16, 2020, the entire contents of each are incorporated herein by reference.

TECHNICAL FIELD

The present disclosure relates to a switch device, an in-vehicle communication system, and a communication method.

BACKGROUND ART

To date, a technology of mirroring a frame to be transmitted through a target communication port in a network to analyze the frame without interrupting communication using the communication port, has been known.

For example, PATENT LITERATURE 1 (Japanese Laid-Open Patent Publication No. 2018-107584) discloses a network device as follows. That is, this network device includes: a first port through which a first frame is transmitted and received; frame aggregation means for generating a second frame that includes, in a payload, mirroring data having a predetermined length and extracted from a predetermined position in the first frame; and a second port through which the second frame is outputted.

Meanwhile, PATENT LITERATURE 2 (International Publication No. WO2012/133060) discloses a network system as follows. That is, this network system includes: a switch; and a controller that sets, in a flow table of the switch, a flow entry defining a rule and an action to uniformly control packets as a flow. The controller maps and retains tag information attached to each of packets flowing through a network and flow cookie information indicating the flow entry corresponding to the packet, thereby virtually handling a plurality of VLANs (Virtual Local Area Networks).

CITATION LIST

Patent Literature

PATENT LITERATURE 1: Japanese Laid-Open Patent Publication No. 2018-107584
PATENT LITERATURE 2: International Publication No. WO2012/133060
PATENT LITERATURE 3: Japanese Laid-Open Patent Publication No. 2000-183936
PATENT LITERATURE 4: Japanese Laid-Open Patent Publication No. 2009-33577

Non-Patent Literature

NON-PATENT LITERATURE 1: Cisco Systems, Inc., "Cisco Small Business 300 1.1 Series Managed Switch Administration Guide", 2011, pp. 67-69, 79-81

SUMMARY OF THE INVENTION

A switch device according to the present disclosure is a switch device used in a vehicle in which a plurality of function units and a diagnosis device are installed. The switch device includes: a plurality of communication ports; a switch unit configured to relay a frame which has been transmitted from a function unit and to which information including an ID (Identifier) of a VLAN (Virtual Local Area Network) and priority information is added, to another function unit via a communication port, according to the priority information; and a duplication unit configured to, when the diagnosis device is connected to another switch device, duplicate the frame to be relayed via a designated communication port among the plurality of communication ports, thereby generating a duplicate frame for diagnosis. The duplication unit is able to set the priority information to be added to the duplicate frame for diagnosis, separately from the priority information to be added to the frame as the original. The switch unit outputs the duplicate frame for diagnosis generated by the duplication unit, from a communication port corresponding to the other switch device, according to the priority information set by the duplication unit.

An in-vehicle communication system according to the present disclosure is an in-vehicle communication system used in a vehicle in which a plurality of function units and a diagnosis device are installed. The system includes a plurality of switch devices. Each switch device includes a plurality of communication ports. Each switch device is configured to relay a frame, which has been transmitted from a function unit and to which information including an ID of a VLAN and priority information is added, to another function unit via a communication port, according to the priority information. When the diagnosis device is connected to another switch device, the switch device generates a duplicate frame for diagnosis by duplicating the frame to be relayed via a designated communication port among the plurality of communication ports, and outputs the generated duplicate frame for diagnosis from a communication port corresponding to the other switch device. The switch device is able to set the priority information to be added to the duplicate frame for diagnosis, separately from the priority information to be added to the frame as the original. The switch device outputs the generated duplicate frame for diagnosis from a communication port corresponding to the other switch device, according to the set priority information.

A communication method according to the present disclosure is a communication method for a switch device used in a vehicle in which a plurality of function units and a diagnosis device are installed. The switch device includes a plurality of communication ports. The switch device relays a frame, which has been transmitted from a function unit and to which information including an ID of a VLAN and priority information is added, to another function unit via a communication port, according to the priority information. The method includes: when the diagnosis device is connected to another switch device, generating a duplicate frame for diagnosis by duplicating the frame to be relayed via a designated communication port among the plurality of communication ports; and outputting the generated duplicate frame for diagnosis from a communication port corresponding to the other switch device. In generating the duplicate frame for diagnosis, the priority information to be added to the duplicate frame for diagnosis is set separately from the priority information to be added to the frame as the original. In outputting the duplicate frame for diagnosis, the duplicate frame for diagnosis is outputted from a communication port corresponding to the other switch device, according to the set priority information.

One mode of the present disclosure can be realized not only as a switch device that includes such a characteristic processing unit but also as a semiconductor integrated circuit that realizes a part or the entirety of the switch device, or as a program for causing a computer to execute process steps in the switch device. Moreover, one mode of the present disclosure can be realized as a semiconductor integrated circuit that realizes a part or the entirety of an in-vehicle communication system including the switch device, or as a program for causing a computer to execute process steps in the in-vehicle communication system.

BRIEF DESCRIPTION OF DRAWINGS

FIG. 2 shows an example of VID, MAC address, and IP address of each of devices in the in-vehicle communication system according to the embodiment of the present disclosure.

DETAILED DESCRIPTION

Figure 1:
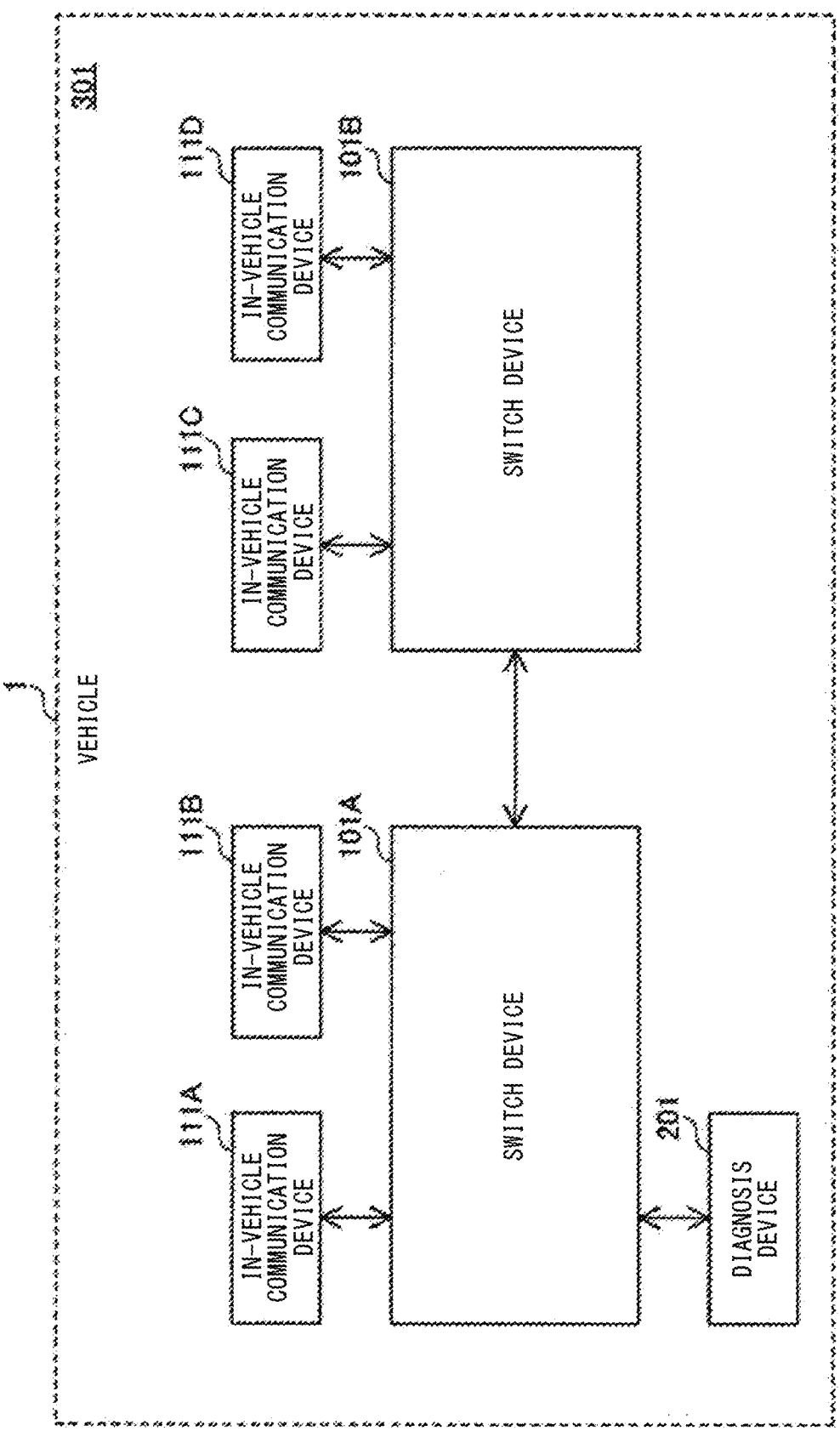
FIG. 1 shows a configuration of an in-vehicle communication system according to an embodiment of the present disclosure.

Problems to be Solved by the Present Disclosure

Beyond the technologies described in PATENT LITERATURES 1 to 4, there is a demand for a technology that realizes smooth communication between switch devices in an in-vehicle network.

The present disclosure has been made to solve the above problem. An object of the present disclosure is to provide a switch device, an in-vehicle communication system, and a communication method capable of realizing smooth communication between switch devices in an in-vehicle network.

Effects of the Present Disclosure

According to the present disclosure, it is possible to realize smooth communication between switch devices in an in-vehicle network.

Outline of Embodiment of the Present Disclosure

First, contents of an embodiment of the present disclosure are listed and described.

(1) A switch device according to an embodiment of the present disclosure is a switch device used in a vehicle in which a plurality of function units and a diagnosis device are installed. The switch device includes: a plurality of communication ports; a switch unit configured to relay a frame which has been transmitted from a function unit and to which information including an ID of a VLAN and priority information is added, to another function unit via a communication port, according to the priority information; and a duplication unit configured to, when the diagnosis device is connected to another switch device, duplicate the frame to be relayed via a designated communication port among the plurality of communication ports, thereby generating a duplicate frame for diagnosis. The duplication unit is able to set the priority information to be added to the duplicate frame for diagnosis, separately from the priority information to be added to the frame as the original. The switch unit outputs the duplicate frame for diagnosis generated by the duplication unit, from a communication port corresponding to the other switch device, according to the priority information set by the duplication unit.

With this configuration, the priority information to be added to the duplicate frame for diagnosis is set separately from the priority information to be added to the frame as the original, and the duplicate frame for diagnosis is outputted from the communication port corresponding to the other switch device, according to the set priority information. Thus, the priority information of the duplicate frame for diagnosis can be set according to the degrees of importance of the original frame and the duplicate frame for diagnosis. Therefore, the original frame or the duplicate frame for diagnosis, whichever has the higher degree of importance, can be more reliably transmitted to the other switch device while suppressing delay. Consequently, smooth communication between the switch devices in an in-vehicle network can be realized.

(2) Preferably, the duplication unit sets, as the priority information to be added to the duplicate frame for diagnosis, a priority level lower than a priority level indicated by the priority information to be added to the frame as the original.

With this configuration, when the degree of importance of the original frame is higher than the degree of importance of the duplicate frame for diagnosis, the original frame can be more reliably transmitted to the other switch device while suppressing delay.

(3) Preferably, the duplication unit sets, as the priority information to be added to the duplicate frame for diagnosis, a priority level higher than a priority level indicated by the priority information to be added to the frame as the original.

With this configuration, when the degree of importance of the duplicate frame for diagnosis is higher than the degree of importance of the original frame, the duplicate frame for diagnosis can be more reliably transmitted to the other switch device while suppressing delay.

(4) Preferably, the switch device further includes an acquisition unit configured to acquire connection information that allows recognition of a switch device to which the diagnosis device is connected, in an in-vehicle network including the plurality of switch devices. The duplication unit recognizes that the diagnosis device is connected to the other switch device, based on the connection information acquired by the acquisition unit.

With this configuration, for example, in the in-vehicle network in which the connection relationship between the diagnosis device and the switch device is not fixed in advance, it is possible to recognize that the diagnosis device is newly connected to another switch device, and generate a duplicate frame for diagnosis based on a target frame.

(5) Preferably, the duplication unit generates the duplicate frame for diagnosis to which specific information indicating that the duplicate frame for diagnosis should be transmitted to the diagnosis device is added.

With this configuration, in the other switch device having received the duplicate frame for diagnosis, the duplicate frame for diagnosis can be easily distinguished from normal frames.

(6) An in-vehicle communication system according to the embodiment of the present disclosure is an in-vehicle communication system used in a vehicle in which a plurality of function units and a diagnosis device are installed. The system includes a plurality of switch devices. Each switch device includes a plurality of communication ports. Each switch device is configured to relay a frame, which has been transmitted from a function unit and to which information including an ID of a VLAN and priority information is added, to another function unit via a communication port, according to the priority information. When the diagnosis device is connected to another switch device, the switch device generates a duplicate frame for diagnosis by duplicating the frame to be relayed via a designated communication port among the plurality of communication ports, and outputs the generated duplicate frame for diagnosis from a communication port corresponding to the other switch device. The switch device is able to set the priority information to be added to the duplicate frame for diagnosis, separately from the priority information to be added to the frame as the original. The switch device outputs the duplicate frame for diagnosis from a communication port corresponding to the other switch device, according to the set priority information.

With this configuration, the priority information to be added to the duplicate frame for diagnosis is set separately from the priority information to be added to the frame as the original, and the duplicate frame for diagnosis is outputted from the communication port corresponding to the other switch device, according to the set priority information. Thus, the priority information of the duplicate frame for diagnosis can be set according to the degrees of importance of the original frame and the duplicate frame for diagnosis. Therefore, the original frame or the duplicate frame for diagnosis, whichever has the higher degree of importance, can be more reliably transmitted to the other switch device while suppressing delay. Consequently, smooth communication between the switch devices in the in-vehicle network can be realized.

(7) A communication method according to the embodiment of the present disclosure is a communication method for a switch device used in a vehicle in which a plurality of function units and a diagnosis device are installed. The switch device includes a plurality of communication ports. The switch device relays a frame, which has been transmitted from a function unit and to which information including an ID of a VLAN and priority information is added, to another function unit via a communication port, according to the priority information. The method includes: when the diagnosis device is connected to another switch device, generating a duplicate frame for diagnosis by duplicating the frame to be relayed via a designated communication port among the plurality of communication ports; and outputting the generated duplicate frame for diagnosis from a communication port corresponding to the other switch device. In generating the duplicate frame for diagnosis, the priority information to be added to the duplicate frame for diagnosis is set separately from the priority information to be added to the frame as the original. In outputting the duplicate frame for diagnosis, the duplicate frame for diagnosis is outputted from a communication port corresponding to the other switch device, according to the set priority information.

In this method, the priority information to be added to the duplicate frame for diagnosis is set separately from the priority information to be added to the frame as the original, and the duplicate frame for diagnosis is outputted from the communication port corresponding to the other switch device, according to the set priority information. Thus, the priority information of the duplicate frame for diagnosis can be set according to the degrees of importance of the original frame and the duplicate frame for diagnosis. Therefore, the original frame or the duplicate frame for diagnosis, whichever has the higher degree of importance, can be more reliably transmitted to the other switch device while suppressing delay. Consequently, smooth communication between the switch devices in the in-vehicle network can be realized.

Details of Embodiment of the Present Disclosure

Hereinafter, an embodiment of the present disclosure will be described with reference to the drawings. In the drawings, the same or corresponding parts are denoted by the same reference signs, and description thereof is not repeated. At least some parts of the embodiment described below may be combined as desired.

[Configuration and Basic Operation]

FIG. 1 shows a configuration of an in-vehicle communication system according to the embodiment of the present disclosure.

With reference to FIG. 1, an in-vehicle communication system 301 includes a plurality of switch devices 101, a plurality of in-vehicle communication devices 111, and a diagnosis device 201. The in-vehicle communication system 301 is installed in a vehicle 1.

More specifically, the in-vehicle communication system 301 includes a switch device 101A and a switch device 101B as the switch devices 101. The in-vehicle communication system 301 includes in-vehicle communication devices 111A, 111B, 111C, 111D as the in-vehicle communication devices 111. The switch device 101A is an example of a second switch. The switch device 101B is an example of a first switch. The in-vehicle communication devices 111 are examples of function units.

The in-vehicle communication system 301 may not necessarily include four in-vehicle communication devices 111, and may include two, three, five, or more in-vehicle communication devices 111.

Examples of the in-vehicle communication devices 111 include an automated driving ECU (Electronic Control Unit), a sensor, a navigation device, a TCU (Telematics Communication Unit), a central gateway, a human-machine interface, a camera, etc. The in-vehicle communication devices 111 can communicate with the switch devices 101.

The connection relationship between each switch device 101 and each in-vehicle communication device 111 in the in-vehicle communication system 301 is fixed, for example.

A switch device 101 and an in-vehicle communication device 111 are connected to each other by an in-vehicle Ethernet (registered trademark) communication cable, i.e., an Ethernet cable, for example. The switch device 101A and the switch device 101B are connected to each other by an Ethernet cable, for example. The switch device 101A and the diagnosis device 201 are connected to each other by an Ethernet cable, for example. For example, the switch devices 101 and the Ethernet cables constitute an in-vehicle network.

The switch devices 101, the in-vehicle communication devices 111, and the diagnosis device 201 communicate with each other by using the Ethernet cables. Between a switch device 101 and an in-vehicle communication device 111, information is exchanged by using an Ethernet frame according to IEEE802.1Q, for example.

FIG. 2 shows an example of VID, MAC address, and IP address of each device in the in-vehicle communication system according to the embodiment of the present disclosure.

With reference to FIG. 2, in the in-vehicle communication system 301, an ID of a VLAN to which the in-vehicle communication device 111A and the diagnosis device 201 belong is "222". An ID of a VLAN to which the in-vehicle communication devices 111B, 111C belong is "111". IDs of VLANs to which the in-vehicle communication device 111D belongs are "111" and "222".

The switch devices 101, the in-vehicle communication devices 111, and the diagnosis device 201 each have a unique MAC (Media Access Control) address. In addition, the switch devices 101, the in-vehicle communication devices 111, and the diagnosis device 201 are assigned different IP (Internet Protocol) addresses.

Figure 3:
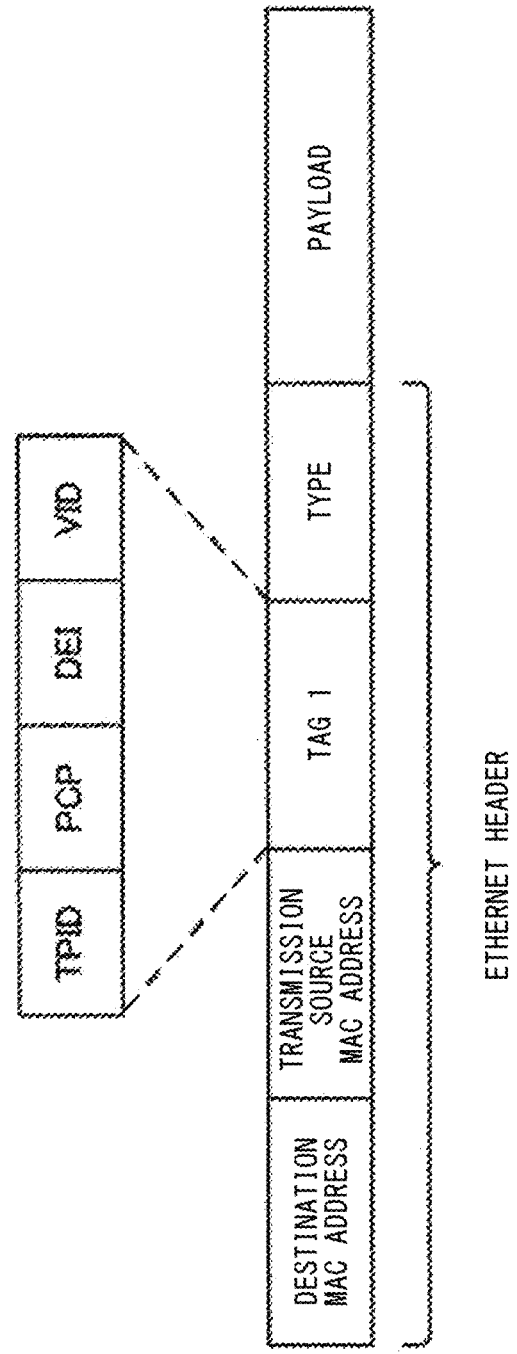
FIG. 3 shows an example of an Ethernet frame transmitted in the in-vehicle communication system according to the embodiment of the present disclosure.

FIG. 3 shows an example of an Ethernet frame transmitted in the in-vehicle communication system according to the embodiment of the present disclosure.

With reference to FIG. 3, the Ethernet frame has an Ethernet header and a payload.

In the Ethernet header, a destination MAC address, a transmission source MAC address, a tag 1, and a type are stored. In the payload, an IP header, a destination IP address, a transmission source IP address, arbitrary data, etc., are stored.

The tag 1 includes a TPID (Tag Protocol Identifier), a PCP (Priority Code Point), a DEI (Drop Eligibility Indicator), and a VID (VLAN Identifier).

In the TPID, information indicating that the Ethernet frame includes the tag 1 is stored. In the PCP, priority information of the Ethernet frame is stored. More specifically, priority information indicating any of eight levels of priority from "0" (lowest priority level) to "7" (highest priority level) is stored in the PCP. In the VID, an ID of a VLAN is stored.

Each switch device 101 performs a relay process of relaying data in the in-vehicle network. More specifically, the switch device 101 can perform the relay process according to, for example, Layer 2 or Layer 3, which is higher in order than Layer 2.

Specifically, in the in-vehicle communication system 301, for example, information is transmitted/received by using an IP packet, according to an IP protocol. The IP packet is stored in an Ethernet frame and transmitted.

The switch device 101 relays the Ethernet frame transmitted between the in-vehicle communication devices 111.

Specifically, the switch device 101 operates in accordance with a communication protocol having a plurality of layers. More specifically, the switch device 101 can function as an L2 switch, and relays an Ethernet frame transmitted between in-vehicle communication devices 111 that belong to the same VLAN. The switch device 101 can also function as an L3 switch, and relays an Ethernet frame between in-vehicle communication devices 111 that belong to different VLANs.

Specifically, when the in-vehicle communication device 111C transmits an IP packet to the in-vehicle communication device 111B, this IP packet includes IP-C and IP-B as a transmission source IP address and a destination IP address, respectively.

Since the in-vehicle communication device 111C and the in-vehicle communication device 111B belong to the same VLAN, the in-vehicle communication device 111C writes 111, MAC-B, and MAC-C, as the VID, the destination MAC address, and the transmission source MAC address in the tag 1, respectively, into the Ethernet frame.

The in-vehicle communication device 111C transmits the Ethernet frame having the IP packet stored therein, to the switch device 101B.

Upon receiving the Ethernet frame from the in-vehicle communication device 111C, the switch device 101B performs a layer 2 switching process on the received Ethernet frame, thereby transmitting the Ethernet frame to the in-vehicle communication device 111B via the switch device 101A.

When the in-vehicle communication device 111B transmits an IP packet to the in-vehicle communication device 111A, this IP packet includes IP-B and IP-A as the transmission source IP address and the destination IP address, respectively.

Since the in-vehicle communication device 111B and the in-vehicle communication device 111A belong to different VLANs, the in-vehicle communication device 111B writes 111, MAC-F (i.e., the MAC address of the switch device 101A serving as a default gateway), and MAC-B, as the VID, the destination MAC address, and the transmission source MAC address in the tag 1, respectively, into the Ethernet frame.

The in-vehicle communication device 111B transmits the Ethernet frame having the IP packet stored therein, to the switch device 101A.

Upon receiving the Ethernet frame from the in-vehicle communication device 111B, the switch device 101A performs a layer 3 relaying process on the received Ethernet frame, thereby transmitting the Ethernet frame to the in-vehicle communication device 111A.

When an abnormality has occurred in the in-vehicle communication system 301, the diagnosis device 201 analyzes the Ethernet frames transmitted/received between the in-vehicle communication devices 111 to specify the cause and position of the abnormality.

More specifically, for example, when an abnormality has occurred in the in-vehicle communication system 301, an administrator of the in-vehicle communication system 301 designates, as a monitoring target, any one of the plurality of communication ports 54 in the switch device 101. Hereinafter, the communication port 54 designated as the monitoring target is also referred to as a designated port 54.

The diagnosis device 201 analyzes the Ethernet frame transmitted through the designated port to specify the cause and position of the abnormality. Specifically, the diagnosis device 201 receives, from the switch device 101, a mirror frame that is a duplicate of the Ethernet frame transmitted through the designated port, and analyzes the received mirror frame.

[Configuration of Switch Device]

Figure 4:
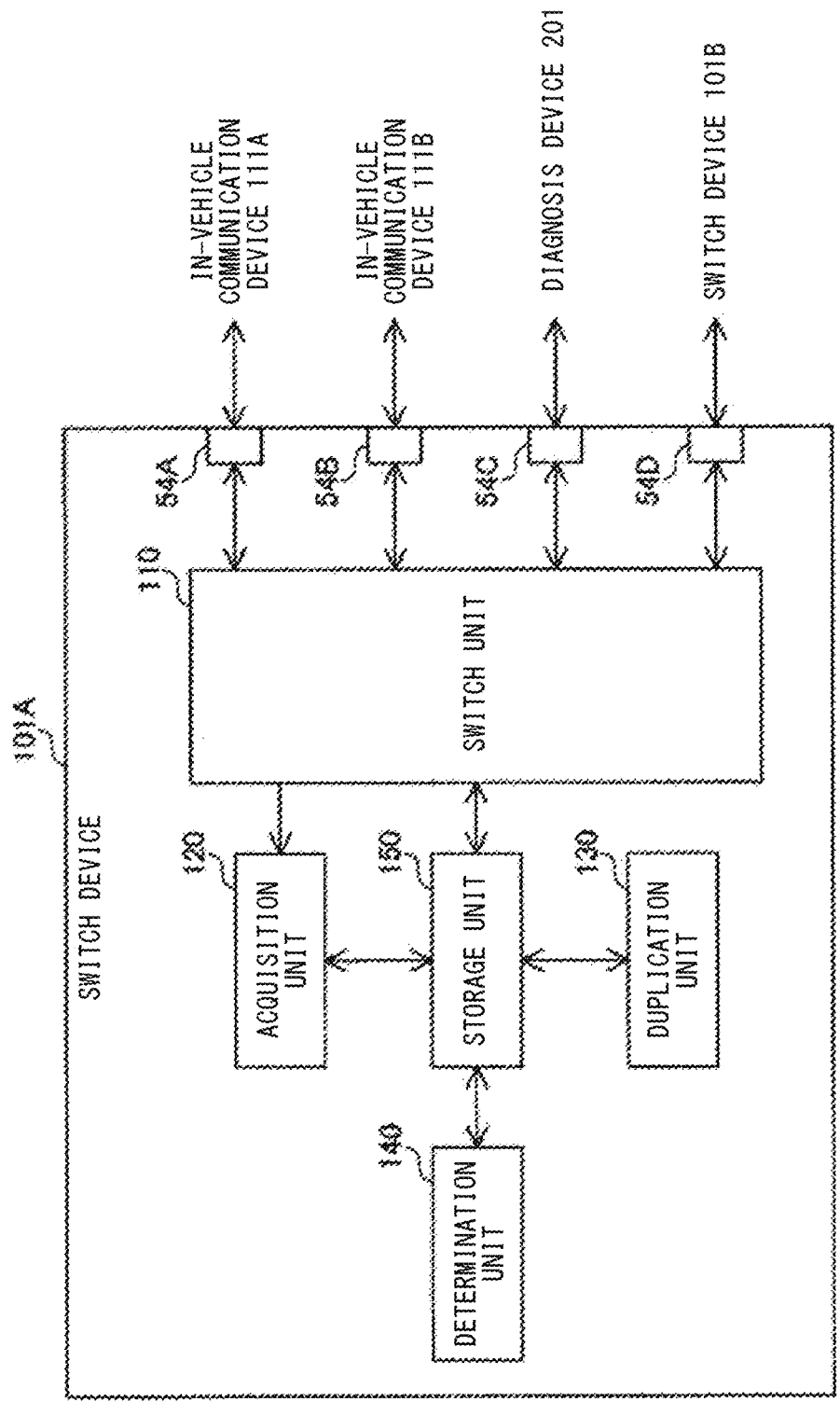
FIG. 4 shows an example of a configuration of a switch device in the in-vehicle communication system according to the embodiment of the present disclosure.
Figure 5:
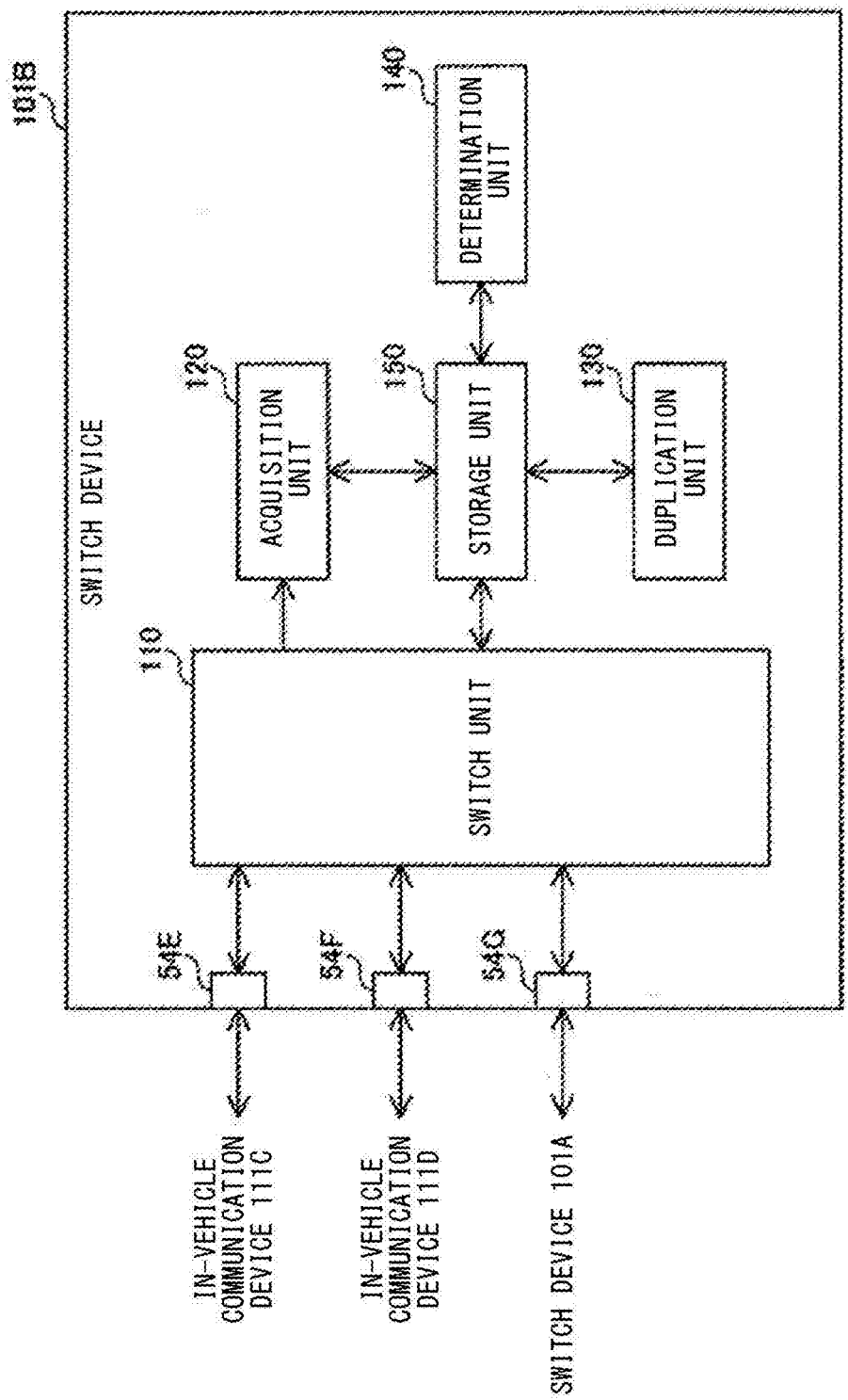
FIG. 5 shows an example of a configuration of a switch device in the in-vehicle communication system according to the embodiment of the present disclosure.

FIG. 4 and FIG. 5 show examples of configurations of switch devices in the in-vehicle communication system according to the embodiment of the present disclosure. FIG. 4 shows the configuration of the switch device 101A. FIG. 5 shows the configuration of the switch device 101B.

With reference to FIG. 4 and FIG. 5, each switch device 101 includes a switch unit 110, an acquisition unit 120, a duplication unit 130, a determination unit 140, a storage unit 150, and a plurality of communication ports 54.

For example, the switch unit 110, the acquisition unit 120, the duplication unit 130, and the determination unit 140 are implemented by a processor such as a CPU (Central Processing Unit) or a DSP (Digital Signal Processor).

The storage unit 150 is a nonvolatile memory, for example. For example, in the storage unit 150 in the switch device 101 having the designated port 54, designation information for specifying the designated port 54 is stored.

Each communication port 54 is a terminal to which, for example, an Ethernet cable can be connected. The communication ports 54 can be connected to the in-vehicle communication devices 111, the diagnosis device 201, and another switch device 101.

In the example shown in FIG. 4, the switch device 101A includes communication ports 54A, 54B, 54C, 54D as the communication ports 54. The communication ports 54A, 54B, 54C, and 54D are connected to the in-vehicle communication device 111A, the in-vehicle communication device 111B, the diagnosis device 201, and the switch device 101B, respectively, via Ethernet cables.

In the example shown in FIG. 5, the switch device 101B includes communication ports 54E, 54F, 54G as the communication ports 54. The communication ports 54E, 54F, and 54G are connected to the in-vehicle communication device 111C, the in-vehicle communication device 111D, and the switch device 101A, respectively, via Ethernet cables.

The switch device 101A may not necessarily include four communication ports 54, and may include two, three, five, or more communication ports 54. The switch device 101B may not necessarily include three communication ports 54, and may include two, four, or more communication ports 54.

[Switch Unit]

Each switch unit 110 relays an Ethernet frame, which has been transmitted from an in-vehicle communication device 111 and to which information including an ID of a VLAN and priority information is added, to another in-vehicle communication device 111 via a communication port 54, according to the priority information.

The switch unit 110 performs the layer 2 or layer 3 relaying process on the Ethernet frame received via the communication port 54.

More specifically, upon receiving the Ethernet frame transmitted from the in-vehicle communication device 111 via the communication port 54, the switch unit 110 stores the received Ethernet frame in the storage unit 150.

For example, the storage unit 150 is provided with queues for the priority levels of Ethernet frames.

The switch unit 110 refers to the priority information stored in the PCP in the tag 1 of the received Ethernet frame, and distributes the Ethernet frame to a queue corresponding to the priority level of the Ethernet frame, thereby storing the Ethernet frame in the storage unit 150.

Then, the switch unit 110 acquires an Ethernet frame from each queue in the storage unit 150 in a cycle corresponding to the priority level, for example, and outputs the acquired Ethernet frame from the communication port 54 corresponding to the destination in-vehicle communication device 111.

More specifically, for example, the switch unit 110 has a plurality of terminals (not shown) respectively connected to the plurality of communication ports 54. Each terminal is assigned a unique logical port number.

The storage unit 150 stores therein an ARP (Address Resolution Protocol) table and an ARL (Address Resolution Logic) table for each ID of a VLAN.

The contents of the ARP table and the ARL table are determined in advance by the user, for example, based on the connection relationship which is fixed in the in-vehicle communication system 301 as described above.

Specifically, the ARP table indicates the correspondence between an IP address and a MAC address. The ARL table indicates the correspondence between a MAC address of an in-vehicle communication device 111 and a logical port number of a terminal to be connected to the in-vehicle communication device 111, and the correspondence between a MAC address of another switch device 101 and a logical port number of a terminal to be connected to the other switch device 101.

The switch unit 110 refers to the destination MAC address, of the Ethernet frame to be outputted, acquired from the storage unit 150. The switch unit 110 acquires, from the ARL table, the logical port number corresponding to the referred destination MAC address, and transmits the received Ethernet frame from the terminal of the acquired logical port number to the in-vehicle communication device 111 or the other switch device 101 via the communication port 54.

[Acquisition Unit]

In the in-vehicle network including the plurality of switch devices 101, the acquisition unit 120 acquires connection information that allows recognition of a switch device 101 to which the diagnosis device 201 is connected.

For example, when the diagnosis device 201 is connected to a communication port 54 of a switch device 101, the diagnosis device 201 transmits authentication information including its own MAC address, etc., to the switch device 101.

In the example shown in FIG. 1 and FIG. 4, when the diagnosis device 201 is connected to the communication port 54C of the switch device 101A via the Ethernet cable, the diagnosis device 201 transmits the authentication information including its own MAC address, etc., to the switch device 101A.

Upon receiving the authentication information from the diagnosis device 201 via the communication port 54C, the switch unit 110 in the switch device 101A outputs the received authentication information to the acquisition unit 120.

Upon receiving the authentication information from the switch unit 110, the acquisition unit 120 in the switch device 101A performs an authentication process for the diagnosis device 201 by using the received authentication information. When the acquisition unit 120 has succeeded in the authentication process for the diagnosis device 201, the acquisition unit 120 adds, to the ARL table in the storage unit 150, the correspondence between the MAC address of the diagnosis device 201 and the logical port number of the terminal to be connected to the communication port 54C.

The acquisition unit 120 in the switch device 101A generates connection information indicating the IP address of the diagnosis device 201 and indicating that the diagnosis device 201 is connected to the switch device 101A, and stores the generated connection information in the storage unit 150. Furthermore, the acquisition unit 120 transmits the generated connection information to the other switch device 101, i.e., the switch device 101B, via the switch unit 110 and the communication port 54.

Upon receiving the connection information from the switch device 101A via the communication port 54G, the switch unit 110 in the switch device 101B outputs the received connection information to the acquisition unit 120.

Upon receiving the connection information from the switch unit 110, the acquisition unit 120 in the switch device 101B stores the received connection information in the storage unit 150.

[Duplication Unit]

If the diagnosis device 201 is connected to the other switch device 101, the duplication unit 130 generates a duplicate frame for diagnosis by duplicating an Ethernet frame to be relayed via a designated port among the plurality of communication ports 54. Hereinafter, the Ethernet frame to be relayed via the designated port is also referred to as a target frame.

(Detection of Target Frame)

For example, the duplication unit 130 recognizes that the diagnosis device 201 is connected to the other switch device 101, based on the connection information acquired by the acquisition unit 120. Moreover, for example, when designation information is stored in the storage unit 150, the duplication unit 130 recognizes a designated port, based on the designation information.

Specifically, the duplication unit 130 in the switch device 101B, based on the connection information in the storage unit 150, recognizes that the diagnosis device 201 is connected to the switch device 101A. Furthermore, the duplication unit 130 in the switch device 101B, based on the designation information in the storage unit 150, recognizes that the communication port 54F is the designated port, for example.

The duplication unit 130 in the switch device 101B monitors the storage unit 150, and detects, as a target frame, an Ethernet frame to be relayed via the communication port 54F, among the Ethernet frames stored in the storage unit 150 by the switch unit 110.

More specifically, the duplication unit 130 detects, as target frames, an Ethernet frame received by the switch unit 110 via the communication port 54F and an Ethernet frame to be transmitted by the switch unit 110 via the communication port 54F, among the Ethernet frames stored in the storage unit 150 by the switch unit 110.

For example, with reference to the ARP table and the ARL table in the storage unit 150, the duplication unit 130 determines, based on a destination IP address and a transmission source IP address stored in an Ethernet frame in the storage unit 150, whether or not this Ethernet frame is a target frame to be relayed via the communication port 54F.

With reference to FIG. 1 and FIG. 5 again, for example, the duplication unit 130 determines that the Ethernet frame whose transmission source IP address is IP-D and whose destination IP address is IP-B, i.e., the Ethernet frame that has been transmitted from the in-vehicle communication device 111D and is addressed to the in-vehicle communication device 111B, is the target frame received by the switch unit 110 via the communication port 54F.

Moreover, for example, the duplication unit 130 determines that the Ethernet frame whose transmission source IP address is IP-C and whose destination IP address is IP-D, i.e., the Ethernet frame that has been transmitted from the in-vehicle communication device 111C and is addressed to the in-vehicle communication device 111D, is the target frame to be transmitted by the switch unit 110 via the communication port 54F.

(Generation of Duplicate Frame for Diagnosis)

Upon detecting a target frame, the duplication unit 130 duplicates this target frame to generate a duplicate frame for diagnosis.

For example, the duplication unit 130 generates a duplicate frame for diagnosis to which specific information indicating that this duplicate frame should be transmitted to the diagnosis device 201 is added.

More specifically, upon detecting the target frame, the duplication unit 130 duplicates the target frame, and adds the specific information to the duplicate frame obtained through the duplication, thereby generating the duplicate frame for diagnosis.

Figure 6:
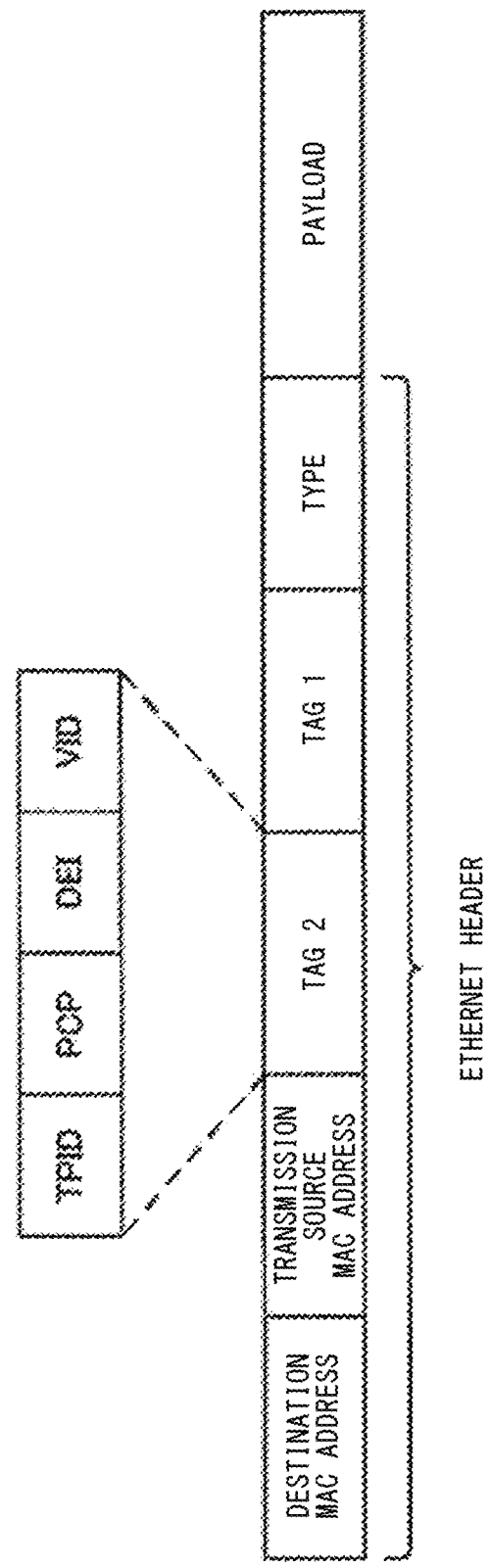
FIG. 6 shows an example of a duplicate frame for diagnosis generated by a duplication unit in the in-vehicle communication system according to the embodiment of the present disclosure.

FIG. 6 shows an example of a duplicate frame for diagnosis generated by the duplication unit in the in-vehicle communication system according to the embodiment of the present disclosure.

With reference to FIG. 6, the duplicate frame for diagnosis has an Ethernet header and a payload.

In the Ethernet header of the duplicate frame for diagnosis, a destination MAC address, a transmission source MAC address, a tag 2, a tag 1, and a type are stored. The duplicate frame for diagnosis is a duplicate of the original target frame except for the tag 2.

The duplication unit 130 adds the tag 2 to the duplicate frame which is the duplicate of the target frame, to generate the duplicate frame for diagnosis. Information stored in the tag 2 is an example of the specific information.

The tag 2, like the tag 1, includes a TPID, a PCP, a DEI, and a VID. In the TPID in the tag 2, information indicating that the duplicate frame for diagnosis includes the tag 2 is stored.

For example, the duplication unit 130 acquires the IP address of the diagnosis device 201 with reference to the connection information in the storage unit 150, and performs subnet mask calculation or the like on the acquired IP address to specify an ID of a VLAN to which the diagnosis device 201 belongs. Then, the duplication unit 130 stores the ID of the VLAN to which the diagnosis device 201 belongs, into the VID of the tag 2.

In the PCP of the tag 2, priority information of the duplicate frame for diagnosis is stored. More specifically, priority information indicating any of eight levels of priority from "0" (lowest priority level) to "7" (highest priority level) is stored in the PCP.

The duplication unit 130 can set the priority information to be added to the duplicate frame for diagnosis, separately from the priority information added to the Ethernet frame as the original. More specifically, the duplication unit 130 sets the priority information of the duplicate frame for diagnosis separately from the priority information stored in the PCP in the tag 1 of the target frame as the original, and stores the set priority information into the PCP in the tag 2 of the duplicate frame for diagnosis.

For example, as the priority information to be added to the duplicate frame for diagnosis, the duplication unit 130 sets a priority level lower than the priority level indicated by the priority information to be added to the target frame as the original. Specifically, if the priority information indicating "2" as the priority level is stored in the PCP in the tag 1 of the target frame as the original, the duplication unit 130 stores the priority information indicating "0" as the priority level into the PCP in the tag 2 of the duplicate frame for diagnosis.

Alternatively, as the priority information to be added to the duplicate frame for diagnosis, the duplication unit 130 sets a priority level higher than the priority level indicated by the priority information to be added to the target frame as the original. Specifically, if the priority information indicating "2" as the priority level is stored in the PCP in the tag 1 of the target frame as the original, the duplication unit 130 stores the priority information indicating "7" as the priority level into the PCP in the tag 2 of the duplicate frame for diagnosis.

The switch unit 110 outputs the duplicate frame for diagnosis generated by the duplication unit 130 from the communication port 54 corresponding to the other switch device 101, according to the priority information set by the duplication unit 130.

More specifically, the duplication unit 130 distributes the generated duplicate frame for diagnosis to the queue corresponding to the priority level of the duplicate frame for diagnosis, thereby storing the duplicate frame for diagnosis in the storage unit 150.

The switch unit 110 in the switch device 101B acquires the duplicate frame for diagnosis from each queue in the storage unit 150 in the cycle according to the priority level, and outputs the acquired duplicate frame for diagnosis from the communication port 54G corresponding to the switch device 101A which is the other switch device 101.

[Determination Unit]

If specific information, i.e., a tag 2, is added to an Ethernet frame that has been transmitted from the other switch device 101 and received by the switch unit 110, the determination unit 140 determines that the Ethernet frame received by the switch unit 110 is a duplicate frame for diagnosis.

More specifically, the determination unit 140 monitors the storage unit 150. When the determination unit 140 has detected an Ethernet frame including a tag 2 from among the Ethernet frames stored in the storage unit 150 by the switch unit 110, the determination unit 140 determines that the detected Ethernet frame is a duplicate frame for diagnosis.

In the example shown in FIG. 1 and FIG. 4, the Ethernet frame that the switch unit 110 in the switch device 101A receives from the switch device 101B via the communication port 54D may be either a duplicate frame for diagnosis or a normal Ethernet frame other than the duplicate frame for diagnosis.

The determination unit 140 in the switch device 101A monitors the storage unit 150, and upon detecting an Ethernet frame including a tag 2 from among the Ethernet frames stored in the storage unit 150 by the switch unit 110, the determination unit 140 determines that this Ethernet frame is a duplicate frame for diagnosis.

For example, the determination unit 140, based on the ID of the VLAN stored in the VID in the tag 2 of the duplicate frame for diagnosis, performs determination regarding output of the duplicate frame for diagnosis to a communication port 54 corresponding to the diagnosis device 201 among the plurality of communication ports 54.

More specifically, if the ID of the VLAN stored in the VID in the tag 2 of the duplicate frame for diagnosis in the storage unit 150 matches the ID of the VLAN to which the diagnosis device 201 belongs, the determination unit 140 determines that the duplicate frame for diagnosis should be outputted to the communication port 54 corresponding to the diagnosis device 201.

Meanwhile, if the ID of the VLAN stored in the VID in the tag 2 of the duplicate frame for diagnosis in the storage unit 150 does not match the ID of the VLAN to which the diagnosis device 201 belongs, the determination unit 140 discards the duplicate frame for diagnosis, for example.

If a plurality of diagnosis devices 201 that belong to different VLANs are respectively connected to the communication ports 54 in the switch device 101A, the determination unit 140 in the switch device 101A may determine, based on the ID of the VLAN stored in the VID in the tag 2 of the duplicate frame for diagnosis, a communication port 54, corresponding to any diagnosis device 201 among the plurality of diagnosis devices 201, to which the duplicate frame for diagnosis should be outputted.

Moreover, if the tag 2 is added to the duplicate frame for diagnosis, the determination unit 140 may determine that the duplicate frame for diagnosis should be outputted from the communication port 54 corresponding to the diagnosis device 201 among the plurality of communication ports 54.

For example, in the storage unit 150, an area for a diagnosis flag is provided for each Ethernet frame. A diagnosis flag is set to ON when the corresponding Ethernet frame is a duplicate frame for diagnosis.

The determination unit 140 sets, to ON, a diagnosis flag of an Ethernet frame that is determined as a duplicate frame for diagnosis, among the Ethernet frames stored in the storage unit 150.

Example of Output of Duplicate Frame for Diagnosis

If a diagnosis flag of an Ethernet frame in the storage unit 150 is ON, the switch unit 110 outputs this Ethernet frame, i.e., the duplicate frame for diagnosis, from the communication port 54 corresponding to the diagnosis device 201 regardless of the destination IP address of the duplicate frame for diagnosis. In this case, the switch unit 110 outputs the duplicate frame for diagnosis from the communication port 54 corresponding to the diagnosis device 201, according to the priority information stored in the tag 2 of the duplicate frame for diagnosis.

For example, in a case where the duplicate frame for diagnosis is to be outputted from the communication port 54 corresponding to the diagnosis device 201, if the diagnosis device 201 is connected to the communication port 54 in the switch device 101 including the switch unit 110, the switch unit 110 outputs the duplicate frame for diagnosis in which the tag 2 has been deleted, to the diagnosis device 201 from the corresponding communication port 54.

More specifically, the determination unit 140, based on the ARL table in the storage unit 150, determines whether or not the diagnosis device 201 is connected to the communication port 54 in the switch device 101 including the determination unit 140.

In the example shown in FIG. 1 and FIG. 4, the determination unit 140 in the switch device 101A, based on the connection information in the storage unit 150, determines that the diagnosis device 201 is connected to the communication port 54C in the switch device 101A.

Upon determining that the diagnosis device 201 is connected to the communication port 54C in the switch device 101A, the determination unit 140 in the switch device 101A deletes the tag 2 from the duplicate frame for diagnosis stored in the storage unit 150.

The switch unit 110 acquires, from the storage unit 150, the duplicate frame for diagnosis in which the tag 2 has been deleted by the determination unit 140 and the diagnosis flag is ON, and outputs the acquired duplicate frame for diagnosis from the communication port 54C to the diagnosis device 201.

Modification

In the switch device 101 according to the embodiment of the present disclosure, the switch unit 110 outputs the duplicate frame for diagnosis in which the tag 2 has been deleted by the determination unit 140, from the corresponding communication port 54 to the diagnosis device 201. However, the present disclosure is not limited thereto. The determination unit 140 may not necessarily delete the tag 2 of the duplicate frame for diagnosis, if the diagnosis device 201 is not connected to a communication port 54 in the switch device 101 including the determination unit 140. Specific description is given below.

Figure 7:
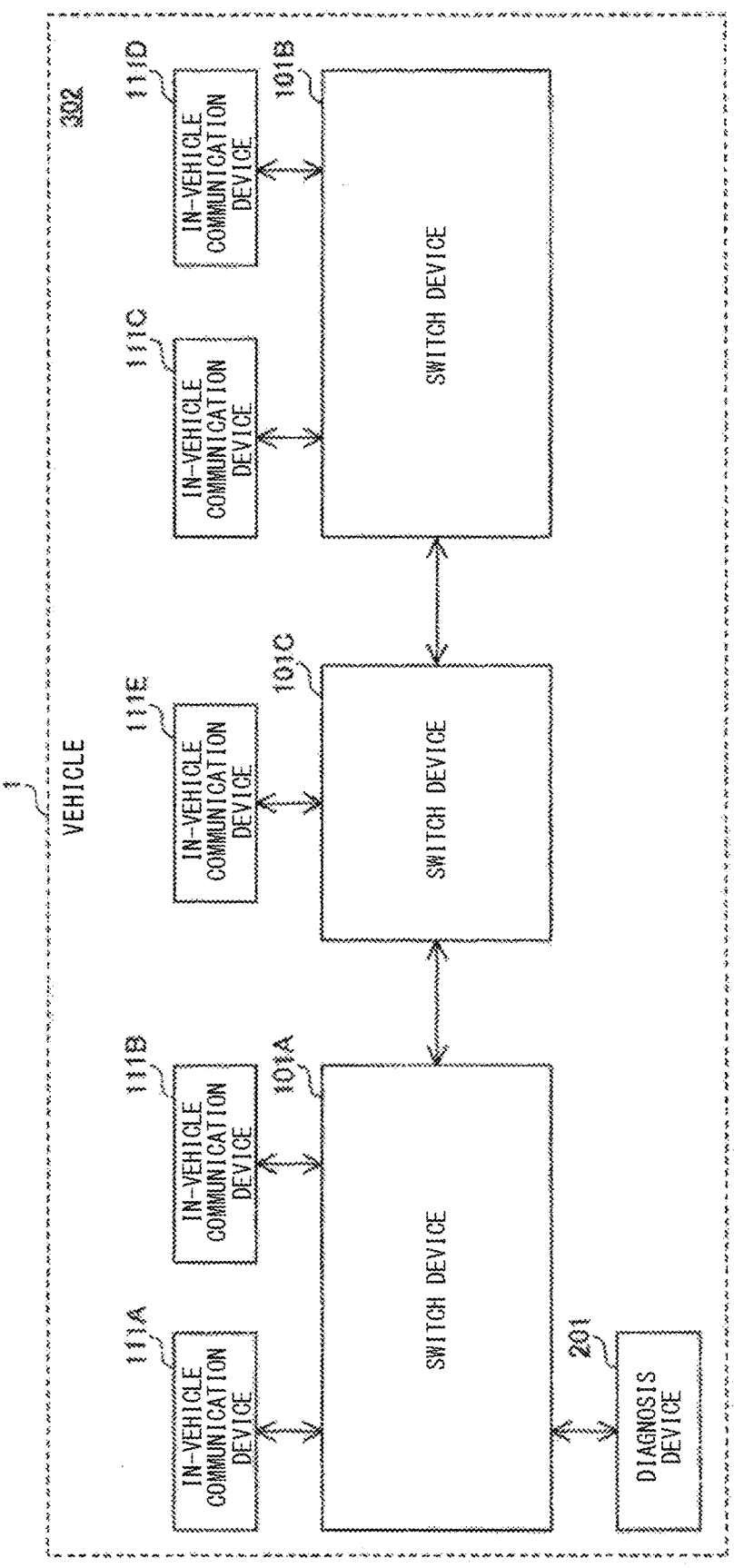
FIG. 7 shows a configuration of an in-vehicle communication system according to a modification of the embodiment of the present disclosure.

FIG. 7 shows a configuration of an in-vehicle communication system according to a modification of the embodiment of the present disclosure.

With reference to FIG. 7, an in-vehicle communication system 302 includes switch devices 101A, 101B, 101C as switch devices 101. In addition, the in-vehicle communication system 302 includes in-vehicle communication devices 111A, 111B, 111C, 111D, 111E as in-vehicle communication devices 111.

The switch device 101A and the switch device 101C are connected to each other by an Ethernet cable, for example. In addition, the switch device 101C and the switch device 101B are connected to each other by an Ethernet cable, for example.

Figure 8:
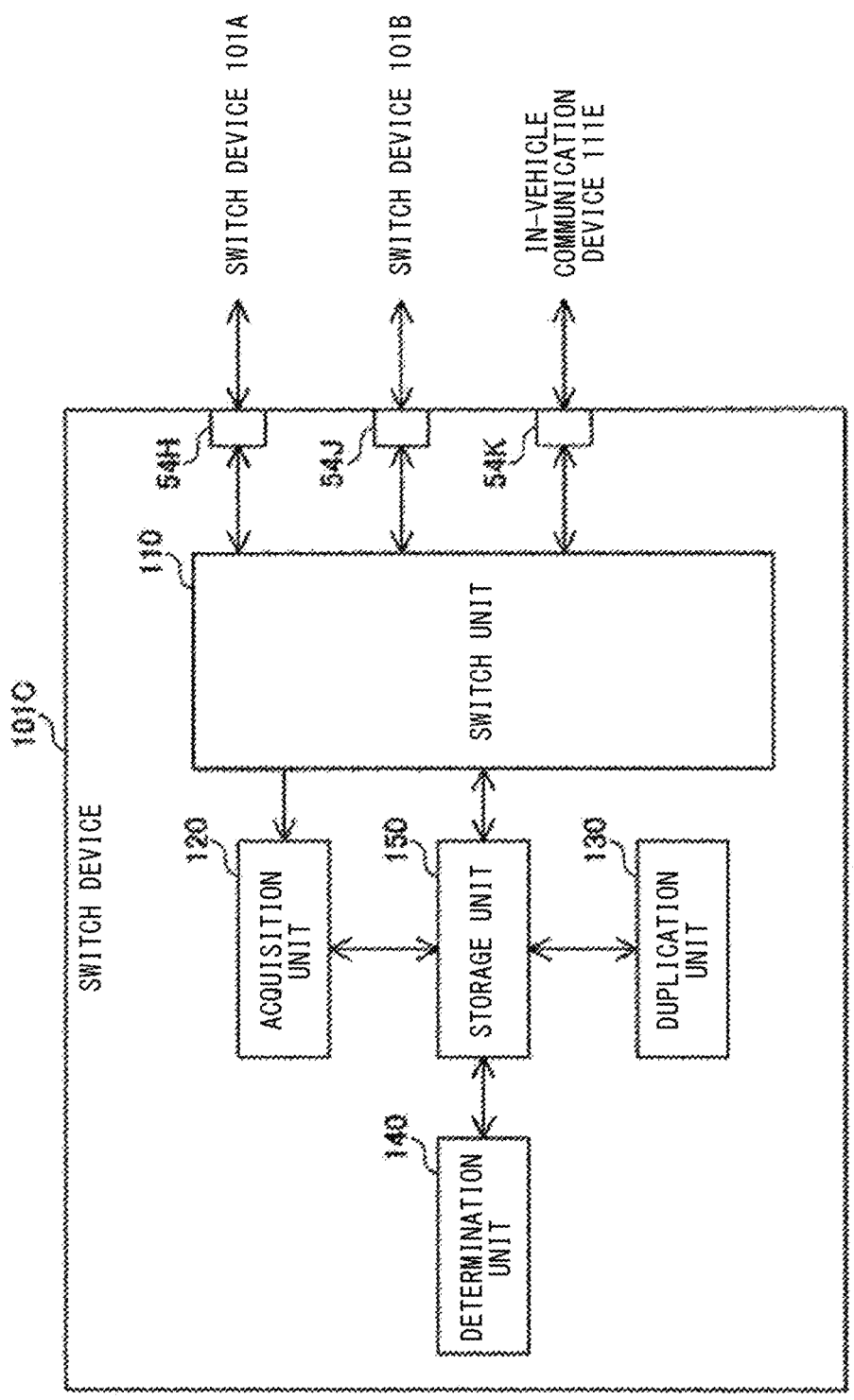
FIG. 8 shows an example of a configuration of a switch device in the in-vehicle communication system according to the embodiment of the present disclosure.

FIG. 8 shows an example of a configuration of a switch device in the in-vehicle communication system according to the embodiment of the present disclosure. FIG. 8 shows a configuration of the switch device 101C.

With reference to FIG. 8, the switch device 101C includes communication ports 54H, 54J, 54K as communication ports 54. The communication ports 54H, 54J, and 54K are connected to the switch device 101A, the switch device 101B, and the in-vehicle communication device 111E, respectively, via Ethernet cables.

As Ethernet frames to be received by the switch unit 110 in the switch device 101C from the switch device 101B via the communication port 54J, a duplicate frame for diagnosis and a normal Ethernet frame other than the duplicate frame for diagnosis are conceivable.

The determination unit 140 in the switch device 101C monitors the storage unit 150. When the determination unit 140 has detected an Ethernet frame including a tag 2 from among the Ethernet frames stored in the storage unit 150 by the switch unit 110, the determination unit 140 determines that the detected Ethernet frame is a duplicate frame for diagnosis. Then, the determination unit 140 sets, to ON, a diagnosis flag of the Ethernet frame determined as a duplicate frame for diagnosis.

Furthermore, the determination unit 140 in the switch device 101C, based on the connection information in the storage unit 150, determines that the diagnosis device 201 is connected to a communication port 54 in the other switch device 101A.

Upon determining that the diagnosis device 201 is connected to the communication port 54 in the other switch device 101A, the determination unit 140 in the switch device 101C does not delete the tag 2 of the duplicate frame for diagnosis in the storage unit 150, thereby maintaining the state where the tag 2 is added to the duplicate frame for diagnosis.

If the diagnosis flag of the Ethernet frame in the storage unit 150 is ON, the switch unit 110 in the switch device 101C outputs the Ethernet frame, i.e., the duplicate frame for diagnosis, from the communication port 54 corresponding to the diagnosis device 201, regardless of the destination IP address of the duplicate frame for diagnosis. In this case, the switch unit 110 outputs the duplicate frame for diagnosis from the communication port 54 corresponding to the diagnosis device 201, according to the priority information stored in the tag 2 of the duplicate frame for diagnosis.

More specifically, the switch unit 110 in the switch device 101C recognizes that the diagnosis device 201 is connected to the switch device 101A with reference to the connection information in the storage unit 150, and outputs the duplicate frame for diagnosis from the communication port 54H corresponding to the switch device 101A.

[Operation Flow]

Each of the devices in the in-vehicle communication system according to the embodiment of the present disclosure includes a computer including a memory. An arithmetic processing unit such as a CPU in the computer reads out, from the memory, a program including a part or all of steps in the following flowchart and sequence and executes the program. The programs for the plurality of devices can be each installed from the outside. The programs for the plurality of devices are each distributed in a state of being stored in a storage medium.

Figure 9:
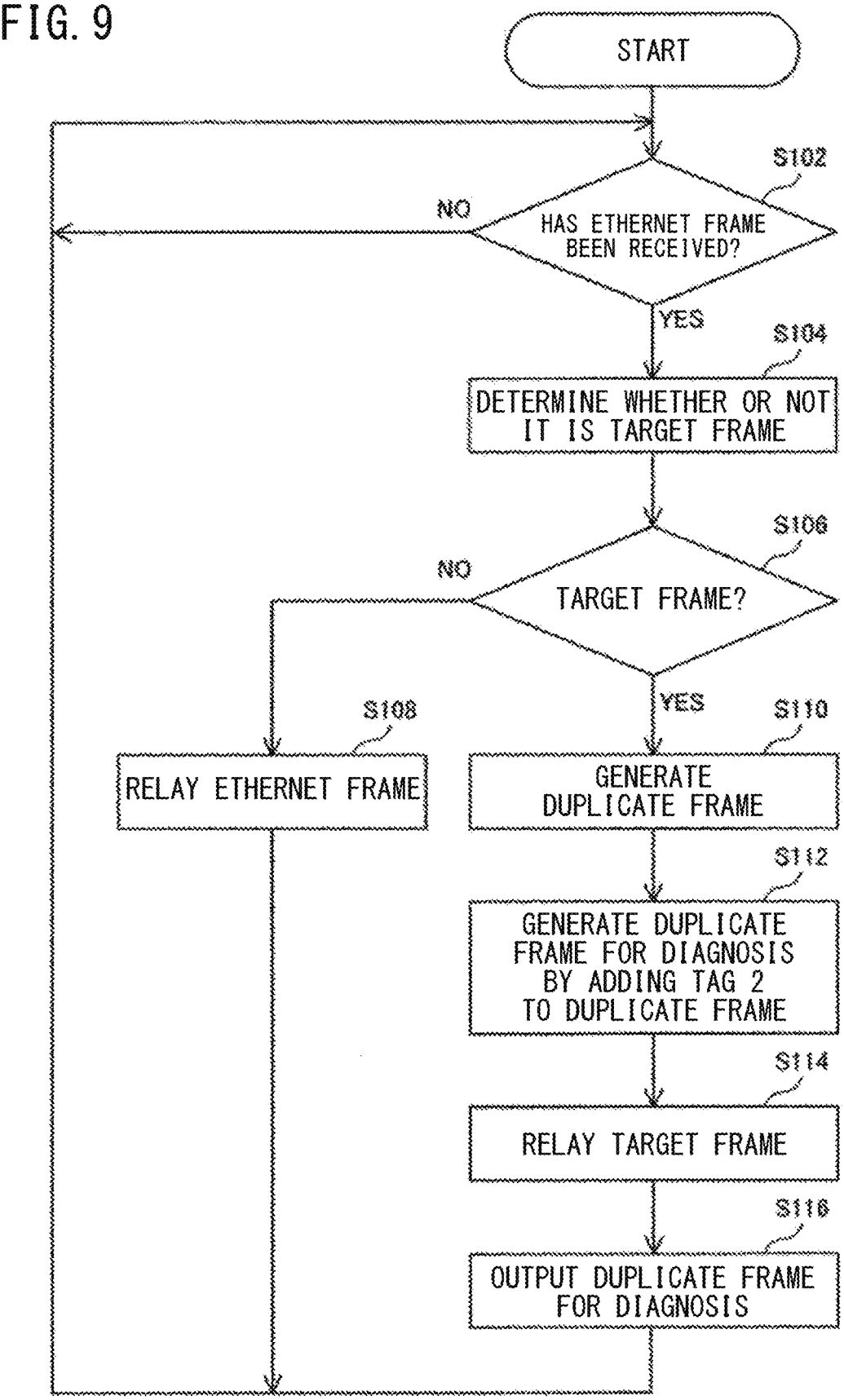
FIG. 9 is a flowchart showing an example of an operation procedure when the switch device according to the embodiment of the present disclosure generates and transmits a duplicate frame for diagnosis.

FIG. 9 is a flowchart showing an example of an operation procedure when the switch device according to the embodiment of the present disclosure generates and transmits a duplicate frame for diagnosis. FIG. 9 shows an example of an operation procedure when the switch device 101B generates and transmits a duplicate frame for diagnosis in a case where the diagnosis device 201 is connected to the switch device 101A as shown in FIG. 1.

With reference to FIG. 9, firstly, the switch device 101B waits for an Ethernet frame (NO in step S102). Upon receiving an Ethernet frame transmitted from an in-vehicle communication device 111 via a communication port 54 (YES in step S102), the switch device 101B determines whether or not this Ethernet frame is an Ethernet frame to be relayed via a designated port. More specifically, the switch device 101B determines whether or not the received Ethernet frame is a target frame (step S104).

Next, when the switch device 101B has determined that the received Ethernet frame is not a target frame (NO in step S106), the switch device 101B relays the Ethernet frame to a destination in-vehicle communication device 111 via a communication port 54, according to priority information stored in a tag 1 of the Ethernet frame (step S108).

Next, the switch device 101B waits for a new Ethernet frame (NO in step S102).

Meanwhile, when the switch device 101B has determined that the received Ethernet frame is a target frame (YES in step S106), the switch device 101B generates a duplicate frame that is a duplicate of the target frame (step S110).

Next, the switch device 101B sets priority information to be added to a duplicate frame for diagnosis, and adds, to the duplicate frame, a tag 2 having the set priority information stored therein, thereby generating the duplicate frame for diagnosis (step S112).

Next, the switch device 101B relays the target frame to a destination in-vehicle communication device 111 via a communication port 54, according to the priority information stored in the tag 1 of the target frame (step S114).

Next, the switch device 101B outputs the duplicate frame for diagnosis from the communication port 54G corresponding to the switch device 101A, according to the set priority information in the tag 2 (step S116).

Next, the switch device 101B waits for a new Ethernet frame (NO in step S102).

Figure 10:
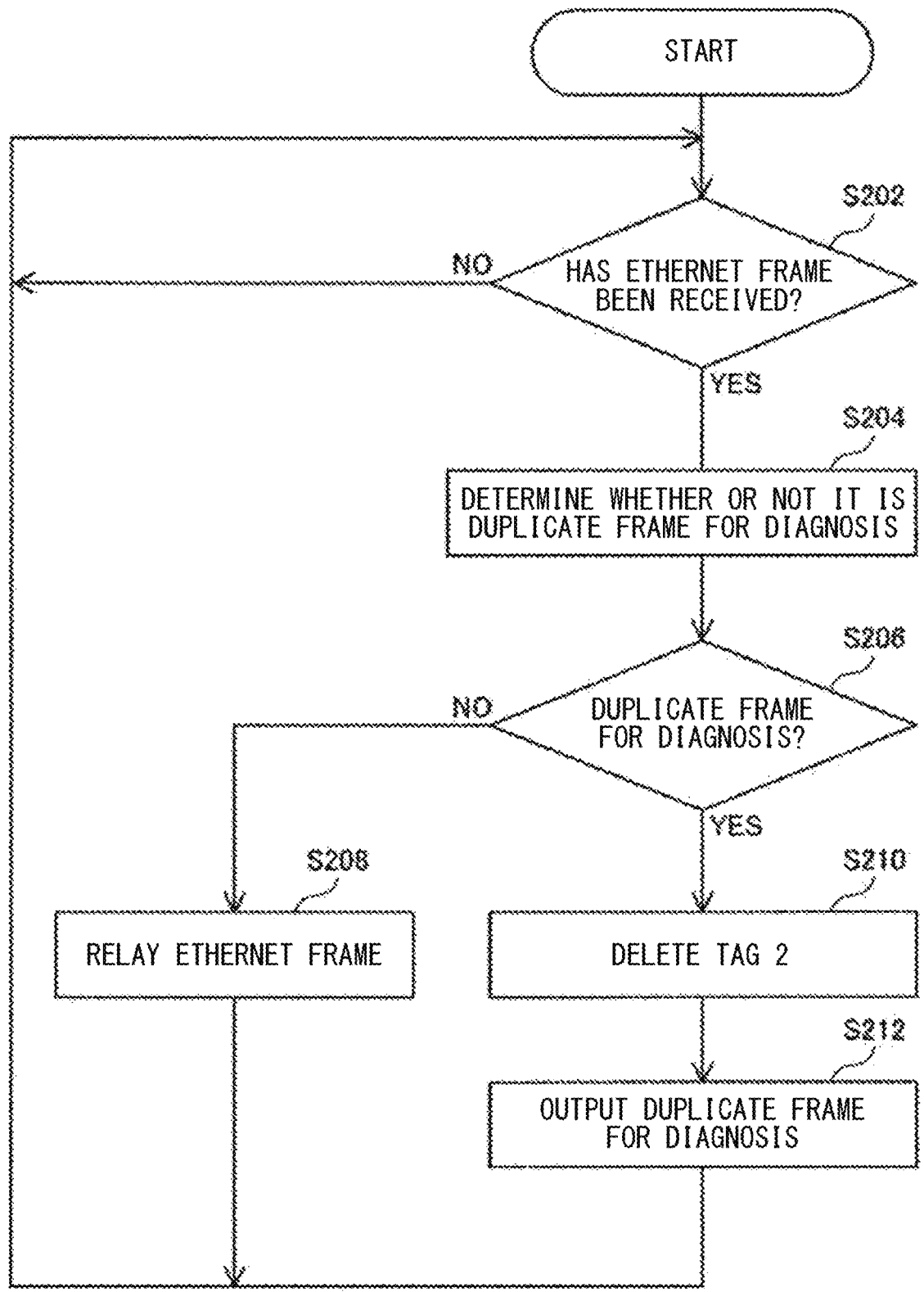
FIG. 10 is a flowchart showing an example of an operation procedure when the switch device according to the embodiment of the present disclosure receives a duplicate frame for diagnosis and transmits the frame to a diagnosis device.

FIG. 10 is a flowchart showing an example of an operation procedure when the switch device according to the embodiment of the present disclosure receives a duplicate frame for diagnosis and transmits the frame to the diagnosis device. FIG. 10 shows an example of an operation procedure when the switch device 101A receives a duplicate frame for diagnosis and transmits the frame to the diagnosis device 201 in a case where the diagnosis device 201 is connected to the switch device 101A as shown in FIG. 1.

With reference to FIG. 10, firstly, the switch device 101A waits for an Ethernet frame (NO in step S202). Upon receiving an Ethernet frame transmitted from the switch device 101B via the communication port 54D (YES in step S202), the switch device 101A determines whether or not the received Ethernet frame is a duplicate frame for diagnosis to be outputted from the communication port 54C corresponding to the diagnosis device 201 (step S204).

When the switch device 101A has determined that the received Ethernet frame is not a duplicate frame for diagnosis (NO in step S206), the switch device 101A relays the Ethernet frame to a destination in-vehicle communication device 111 via a communication port 54 (step S208).

Next, the switch device 101A waits for a new Ethernet frame (NO in step S202).

Meanwhile, when the switch device 101A has determined that the received Ethernet frame is a duplicate frame for diagnosis (YES in step S206), the switch device 101A deletes the tag 2 of the duplicate frame for diagnosis (step S210).

Next, the switch device 101A outputs the duplicate frame for diagnosis in which the tag 2 has been deleted, from the communication port 54C to the diagnosis device 201 regardless of the destination IP address of the duplicate frame for diagnosis (step S212).

Next, the switch device 101A waits for a new Ethernet frame (NO in step S202).

Figure 11:
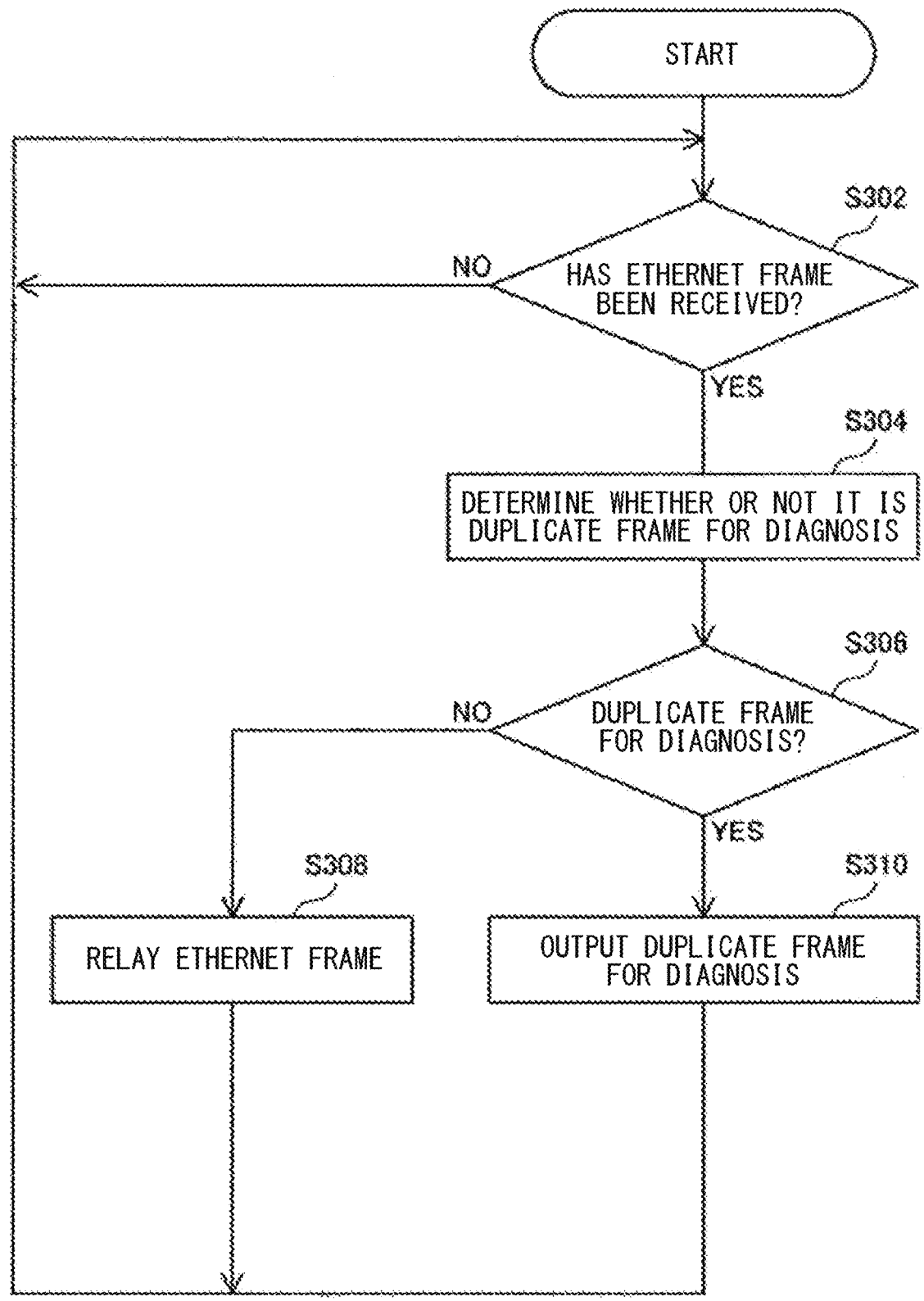
FIG. 11 is a flowchart showing an example of an operation procedure when the switch device according to the modification of the embodiment of the present disclosure receives a duplicate frame for diagnosis and transmits the frame to the diagnosis device.

FIG. 11 is a flowchart showing an example of an operation procedure when the switch device according to the modification of the embodiment of the present disclosure receives a duplicate frame for diagnosis and transmits the frame to the diagnosis device. FIG. 11 shows an example of an operation procedure when the switch device 101C receives a duplicate frame for diagnosis and transmits the frame to the switch device 101A in a case where the diagnosis device 201 is connected to the switch device 101A as shown in FIG. 7.

With reference to FIG. 11, firstly, the switch device 101C waits for an Ethernet frame (NO in step S302). Upon receiving an Ethernet frame transmitted from the switch device 101B via the communication port 54J (YES in step S302), the switch device 101C determines whether or not the received Ethernet frame is a duplicate frame for diagnosis to be outputted from the communication port 54H corresponding to the switch device 101A to which the diagnosis device 201 is connected (step S304).

Next, when the switch device 101C has determined that the received Ethernet frame is not a duplicate frame for diagnosis (NO in step S306), the switch device 101C relays the Ethernet frame to a destination in-vehicle communication device 111 via a communication port 54 (step S308).

Next, the switch device 101C waits for a new Ethernet frame (NO in step S302).

Meanwhile, when the switch device 101C has determined that the received Ethernet frame is a duplicate frame for diagnosis (YES in step S306), the switch device 101C outputs the duplicate frame for diagnosis from the communication port 54H corresponding to the switch device 101A, regardless of the destination IP address of the duplicate frame for diagnosis (step S310).

Next, the switch device 101C waits for a new Ethernet frame (NO in step S302).

Figure 12:
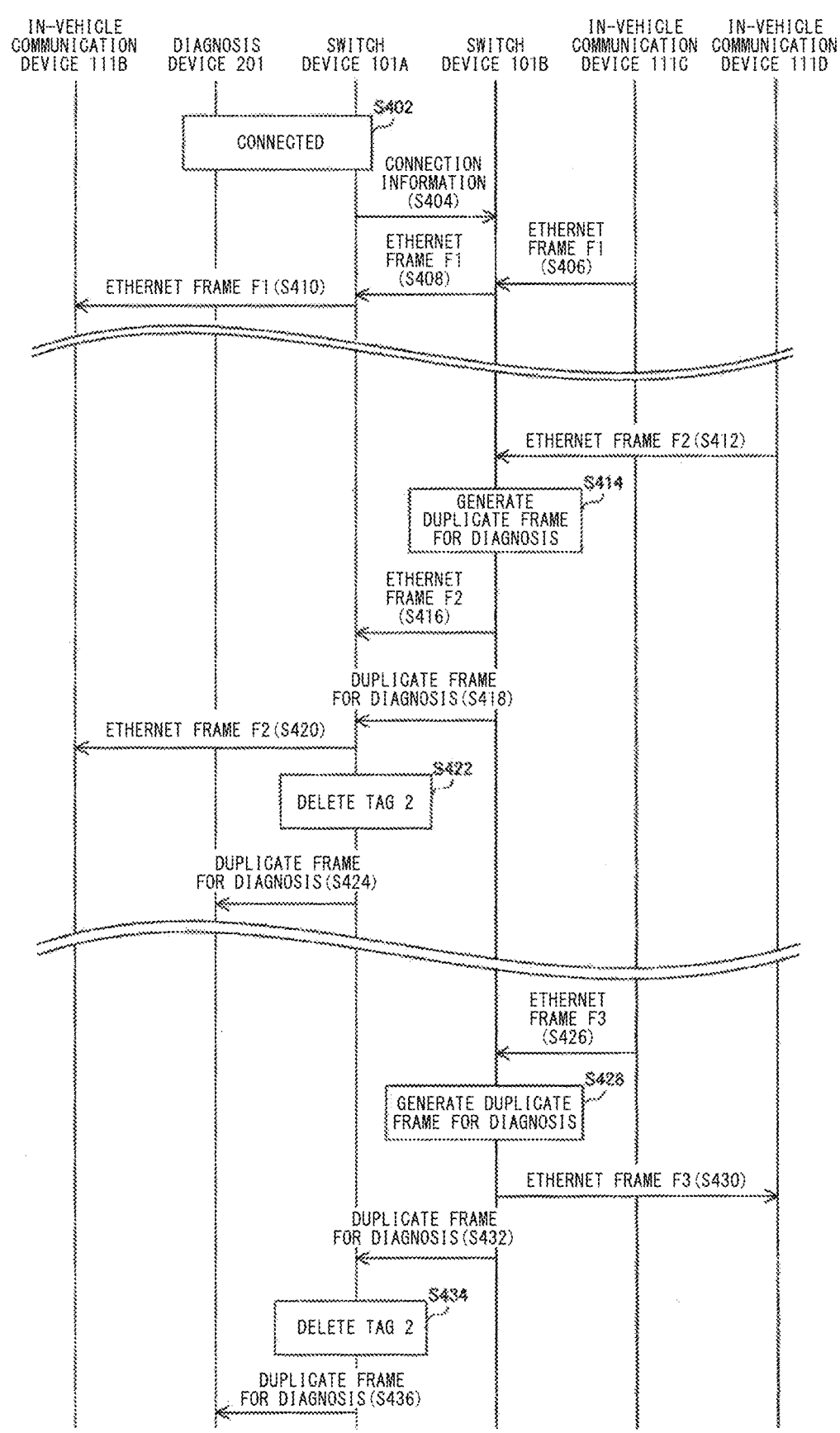
FIG. 12 shows an example of a sequence of a relay process in the in-vehicle communication system according to the embodiment of the present disclosure.

FIG. 12 shows an example of a sequence of a relay process in the in-vehicle communication system according to the embodiment of the present disclosure.

With reference to FIG. 12, firstly, for example, the diagnosis device 201 is connected to the communication port 54C of the switch device 101A via an Ethernet cable (step S402).

Next, the switch device 101A generates connection information indicating that the diagnosis device 201 is connected to the switch device 101A, and transmits the generated connection information to the switch device 101B (step S404).

Next, for example, the in-vehicle communication device 111C transmits, to the switch device 101B, an Ethernet frame F1 addressed to the in-vehicle communication device 111B (step S406).

Next, the switch device 101B performs a relay process for the Ethernet frame F1 received from the in-vehicle communication device 111C via the communication port 54E. Specifically, the switch device 101B transmits the Ethernet frame F1 to the switch device 101A via the communication port 54G, according to priority information stored in a tag 1 of the Ethernet frame F1 (step S408).

Next, the switch device 101A performs a relay process for the Ethernet frame F1 received from the switch device 101B via the communication port 54D. Specifically, the switch device 101A transmits the Ethernet frame F1 to the in-vehicle communication device 111B via the communication port 54B, according to the priority information stored in the tag 1 of the Ethernet frame F1 (step S410).

Next, for example, the in-vehicle communication device 111D transmits an Ethernet frame F2 addressed to the in-vehicle communication device 111B, to the switch device 101B (step S412).

Next, upon receiving the Ethernet frame F2 from the in-vehicle communication device 111C via the communication port 54F which is a designated port, the switch device 101B determines that this Ethernet frame F2 is a target frame. Then, the switch device 101B generates a duplicate frame that is a duplicate of the Ethernet frame F2, sets priority information to be added to a duplicate frame for diagnosis, and adds, to the duplicate frame, a tag 2 in which the set priority information is stored, thereby generating the duplicate frame for diagnosis (step S414).

Next, the switch device 101B performs a relay process for the Ethernet frame F2, according to priority information stored in a tag 1 of the Ethernet frame F2. Specifically, the switch device 101B transmits the Ethernet frame F2 to the switch device 101A via the communication port 54G (step S416).

Furthermore, the switch device 101B transmits the generated duplicate frame for diagnosis to the switch device 101A via the communication port 54G, according to the set priority information stored in the tag 2 (step S418).

Next, the switch device 101A performs a relay process for the Ethernet frame F2 received from the switch device 101B via the communication port 54D. Specifically, the switch device 101A transmits the Ethernet frame F2 to the in-vehicle communication device 111B via the communication port 54B, according to the priority information stored in the tag 1 of the Ethernet frame F2 (step S420).

Next, the switch device 101A receives the duplicate frame for diagnosis from the switch device 101B via the communication port 54D, acquires the priority information stored in the tag 2 of the received duplicate frame for diagnosis, and deletes the tag 2 (step S422).

Next, the switch device 101A transmits the duplicate frame for diagnosis in which the tag 2 has been deleted, to the diagnosis device 201 via the communication port 54C, according to the acquired priority information of the duplicate frame for diagnosis (step S424).

Next, for example, the in-vehicle communication device 111C transmits an Ethernet frame F3 addressed to the in-vehicle communication device 111D, to the switch device 101B (step S426).

Upon receiving the Ethernet frame F3 from the in-vehicle communication device 111C via the communication port 54E, the switch device 101B determines that the Ethernet frame F3 to be transmitted via the communication port 54F which is a designated port is a target frame. Then, the switch device 101B generates a duplicate frame that is a duplicate of the Ethernet frame F3, sets priority information to be added to a duplicate frame for diagnosis, and adds, to the duplicate frame, a tag 2 in which the set priority information is stored, thereby generating the duplicate frame for diagnosis (step S428).

Next, the switch device 101B performs a relay process for the Ethernet frame F3, according to priority information stored in a tag 1 of the Ethernet frame F3. Specifically, the switch device 101B transmits the Ethernet frame F3 to the in-vehicle communication device 111D via the communication port 54F (step S430).

Furthermore, the switch device 101B transmits the generated duplicate frame for diagnosis to the switch device 101A via the communication port 54G, according to the set priority information stored in the tag 2 (step S432).

Next, the switch device 101A receives the duplicate frame for diagnosis from the switch device 101B via the communication port 54D, acquires the priority information stored in the tag 2 of the received duplicate frame for diagnosis, and deletes the tag 2 (step S434).

Next, the switch device 101A transmits the duplicate frame for diagnosis in which the tag 2 has been deleted, to the diagnosis device 201 via the communication port 54C, according to the acquired priority information of the duplicate frame for diagnosis (step S436).

In the in-vehicle communication system 301 according to the embodiment of the present disclosure, the switch devices 101A, 101B each include the determination unit 140. However, the present disclosure is not limited thereto. For example, when the connection relationship between the diagnosis device 201 and the switch device 101A is fixed, the switch device 101B may not necessarily include the determination unit 140 while the switch device 101A includes the determination unit 140.

In the in-vehicle communication system 301 according to the embodiment of the present disclosure, the diagnosis device 201 is connected to the switch device 101A, and the communication port 54F in the switch device 101B is a designated port. However, the present disclosure is not limited thereto. The diagnosis device 201 may be connected to the switch device 101B, and any of the communication ports 54 in the switch device 101A may be a designated port. In this case, the duplication unit 130 in the switch device 101A performs the same process as that performed by the duplication unit 130 in the switch device 101B, and the determination unit 140 in the switch device 101B performs the same process as that performed by the determination unit 140 in the switch device 101A.

In the in-vehicle communication system 301 according to the embodiment of the present disclosure, the duplication unit 130 sets the priority information to be added to the duplicate frame for diagnosis, separately from the priority information to be added to the Ethernet frame as the original. However, the present disclosure is not limited thereto. For example, when the communication port 54 from which the duplicate frame for diagnosis is outputted is different from the communication port 54 from which the Ethernet frame as the original is outputted, the duplication unit 130 need not separately set the priority information to be added to the duplicate frame for diagnosis.

In the switch device 101 according to the embodiment of the present disclosure, the duplication unit 130 generates a duplicate frame for diagnosis by adding, to a duplicate of a target frame, a tag 2 which is information indicating that this frame should be transmitted to the diagnosis device 201. However, the present disclosure is not limited thereto. The duplication unit 130 may generate a duplicate frame for diagnosis by adding, to the duplicate frame, information different from the tag 2, such as 1 bit of information, indicating that this frame should be transmitted to the diagnosis device 201. Alternatively, for example, the duplication unit 130 may generate a duplicate frame for diagnosis in which the content of the duplicate frame is partially changed, instead of adding the information indicating that the frame should be transmitted to the diagnosis device 201.

In the switch device 101 according to the embodiment of the present disclosure, the duplication unit 130 sets priority information of a duplicate frame for diagnosis, and stores the set priority information into a PCP in a tag 2 of the duplicate frame for diagnosis. However, the present disclosure is not limited thereto. The duplication unit 130 may store the set priority information into a PCP in a tag 1 of the duplicate frame for diagnosis. That is, the duplication unit 130 may replace the PCP in the tag 1 of the duplicate frame for diagnosis with the set priority information.

The switch device 101 according to the embodiment of the present disclosure includes the acquisition unit 120. However, the present disclosure is not limited thereto. For example, if the connection relationship between the diagnosis device 201 and the switch device 101A is fixed and the connection information has been stored in the storage unit 150 in advance, the switch device 101 may not necessarily include the acquisition unit 120.

In the switch device 101 according to the embodiment of the present disclosure, when the determination unit 140 has determined that the diagnosis device 201 is connected to a communication port 54 in the switch device 101 including the determination unit 140, the determination unit 140 deletes the tag 2 of the duplicate frame for diagnosis in the storage unit 150. However, the present disclosure is not limited thereto. The determination unit 140 may not necessarily delete the tag 2 of the duplicate frame for diagnosis, regardless of to which communication port 54 of which switch device 101 the diagnosis device 201 is connected. In this case, the switch unit 110 outputs the duplicate frame for diagnosis in which the tag 2 is added, from the corresponding communication port 54 to the diagnosis device 201.

Meanwhile, a technology that realizes smooth communication between switch devices in an in-vehicle network has been demanded.

For example, PATENT LITERATURE 3 discloses a so-called port mirroring technology in which a specific communication port in a switching hub is monitored, and mirroring is performed on frames transmitted through the communication port. In the port mirroring technology described in PATENT LITERATURE 3, an Ethernet frame that the switching hub receives via the monitored communication port and an Ethernet frame that the switching hub transmits via the monitored communication port are duplicated, and destination addresses of the Ethernet frames obtained by duplication are rewritten into the address of a network analyzer. Thus, the Ethernet frames obtained by duplication are transmitted to the network analyzer and analyzed by the network analyzer.

Meanwhile, PATENT LITERATURE 4 discloses a security method for improving security in a system including a plurality of switch devices and a plurality of PCs (Personal Computers). Specifically, in this security method, a PC transmits, to a switch device, a frame including VLAN tag information in which a VLAN number to which the PC belongs is stored. Only when the VLAN tag information included in the frame received from the PC matches a VLAN number associated in advance with a communication port to which the PC is connected, the switch device relays the frame to a destination PC.

Meanwhile, NON-PATENT LITERATURE 1 discloses a procedure for setting a communication port to be monitored and a VLAN to be monitored, in a switch device having a port mirroring function. Moreover, NON-PATENT LITERATURE 1 discloses, as a part of a setting procedure for an LLDP-MED (Link Layer Discovery Protocol-Media Endpoint Discovery) network policy, selection as to whether or not traffic should be VLAN-tagged.

However, these conventional port mirroring technologies cannot realize smooth communication between switch devices in an in-vehicle network in some cases.

More specifically, for example, in the in-vehicle communication system 301 shown in FIG. 1, the switch device 101B including the designated port 54 and the switch device 101A to which the diagnosis device 201 is connected are different switch devices 101. In this case, in order to transmit a mirror frame, which is a duplicate of a target frame, from the switch device 101B to the diagnosis device 201 via the switch device 101A, the mirror frame needs to be transmitted in addition to the normal frame from the switch device 101B to the switch device 101A, which causes an increase in traffic from the switch device 101B to the switch device 101A.

As a result, congestion occurs between the switch device 101B and the switch device 101A, which may cause delay or loss of the mirror frame or the normal frame.

Meanwhile, in the switch device 101 according to the embodiment of the present disclosure, the switch unit 110 relays a frame, which has been transmitted from an in-vehicle communication device 111 and to which information including an ID of a VLAN and priority information is added, to another in-vehicle communication device 111 via a communication port 54, according to the priority information. If the diagnosis device 201 is connected to another switch device 101, the duplication unit 130 duplicates a frame to be relayed via a designated communication port 54 among the plurality of communication ports 54, thereby generating a duplicate frame for diagnosis. The duplication unit 130 is able to set priority information to be added to the duplicate frame for diagnosis, separately from priority information to be added to the frame as the original. The switch unit 110 outputs the duplicate frame for diagnosis generated by the duplication unit 130, from the communication port 54 corresponding to the switch device 101A, according to the priority information set by the duplication unit 130.

In the in-vehicle communication system 301 according to the embodiment of the present disclosure, each of the plurality of switch devices 101 relays a frame, which has been transmitted from an in-vehicle communication device 111 and to which information including an ID of a VLAN and priority information is added, to another in-vehicle communication device 111. If the diagnosis device 201 is connected to the switch device 101A, the switch device 101B duplicates a frame to be relayed via a designated communication port 54 among the plurality of communication ports 54 to generate a duplicate frame for diagnosis, and outputs the generated duplicate frame for diagnosis from a communication port 54 corresponding to the other switch device 101. The switch device 101B is able to set priority information to be added to the duplicate frame for diagnosis, separately from priority information to be added to the frame as the original. The switch device 101B outputs the generated duplicate frame for diagnosis from the communication port 54 corresponding to the switch device 101A, according to the set priority information.

The communication method according to the embodiment of the present disclosure is a communication method used in the switch device 101. In this communication method, firstly, if the diagnosis device 201 is connected to another switch device 101, the switch device 101 duplicates a frame to be relayed via a designated communication port 54 among the plurality of communication ports 54, thereby generating a duplicate frame for diagnosis. Next, the switch device 101 outputs the generated duplicate frame for diagnosis from a communication port 54 corresponding to the other switch device 101. When generating the duplicate frame for diagnosis, the switch device 101 sets priority information to be added to the duplicate frame for diagnosis, separately from priority information to be added to the frame as the original. When outputting the duplicate frame for diagnosis, the switch device 101 outputs the duplicate frame for diagnosis from the communication port 54 corresponding to the other switch device 101, according to the set priority information.

In the aforementioned configuration and method, the priority information to be added to the duplicate frame for diagnosis is set separately from the priority information to be added to the frame as the original, and the duplicate frame for diagnosis is outputted from the communication port corresponding to the other switch device, according to the set priority information. Thus, the priority information of the duplicate frame for diagnosis can be set according to the degrees of importance of the original frame and the duplicate frame for diagnosis. Therefore, the original frame or the duplicate frame for diagnosis, whichever has the higher degree of importance, can be more reliably transmitted to the other switch device while suppressing delay.

Therefore, the switch device, the in-vehicle communication system, and the communication method according to the embodiment of the present disclosure realize smooth communication between switch devices in an in-vehicle network.

The embodiments disclosed herein are merely illustrative and not restrictive in all aspects. The scope of the present disclosure is defined by the scope of the claims rather than the embodiment described above, and is intended to include meaning equivalent to the scope of the claims and all modifications within the scope.

The above description includes the features in the additional notes below.

[Additional Note 1]

A switch device used in a vehicle in which a plurality of function units and a diagnosis device are installed, the switch device comprising:
 a plurality of communication ports;
 a switch unit configured to relay a frame, which has been transmitted from a function unit and to which information including an ID of a VLAN and priority information is added, to another function unit via a communication port, according to the priority information; and
 a duplication unit configured to, when the diagnosis device is connected to another switch device, duplicate the frame to be relayed via a designated communication port among the plurality of communication ports, thereby generating a duplicate frame for diagnosis, wherein
 the duplication unit is able to set the priority information to be added to the duplicate frame for diagnosis, separately from the priority information to be added to the frame as an original,
 the switch unit outputs the duplicate frame for diagnosis generated by the duplication unit, from a communication port corresponding to the other switch device, according to the priority information set by the duplication unit, and
 the switch unit and the duplication unit are implemented by a processor.

[Additional Note 2]

A switch device used in a vehicle in which a plurality of function units and a diagnosis device are installed, the switch device comprising:
 a plurality of communication ports;
 a switch unit configured to relay a frame, which has been transmitted from a function unit and to which information including an ID of a VLAN and priority information is added, to another function unit via a communication port, according to the priority information; and
 a duplication unit configured to, when the diagnosis device is connected to another switch device, duplicate the frame to be relayed via a designated communication port among the plurality of communication ports, thereby generating a duplicate frame for diagnosis, wherein
 the duplication unit is able to set the priority information to be added to the duplicate frame for diagnosis, separately from the priority information to be added to the frame as an original,
 the switch unit outputs the duplicate frame for diagnosis generated by the duplication unit, from a communication port corresponding to the other switch device, according to the priority information set by the duplication unit, and
 the duplication unit generates the duplicate frame for diagnosis which includes an ID of a VLAN of the diagnosis device and to which information indicating that the duplicate frame for diagnosis should be transmitted to the diagnosis device is added.

[Additional Note 3]

An in-vehicle communication system used in a vehicle in which a plurality of function units and a diagnosis device are installed,
 the system comprising a plurality of switch devices,
 each switch device including a plurality of communication ports, wherein
 each switch device is configured to relay a frame, which has been transmitted from a function unit and to which information including an ID of a VLAN and priority information is added, to another function unit via a communication port, according to the priority information,
 when the diagnosis device is connected to another switch device, the switch device generates a duplicate frame for diagnosis by duplicating the frame to be relayed via a designated communication port among the plurality of communication ports, and outputs the generated duplicate frame for diagnosis from a communication port corresponding to the other switch device,
 the switch device is able to set the priority information to be added to the duplicate frame for diagnosis, separately from the priority information to be added to the frame as the original,
 the switch device outputs the generated duplicate frame for diagnosis from the communication port corresponding to the other switch device, according to the set priority information, and
 the function units are ECUs.

[Additional Note 4]

An in-vehicle communication system used in a vehicle in which a plurality of function units and a diagnosis device are installed,
 the system comprising a plurality of switch devices,
 each switch device including a plurality of communication ports, wherein
 each switch device is configured to relay a frame, which has been transmitted from a function unit and to which information including an ID of a VLAN and priority information is added, to another function unit via a communication port, according to the priority information,
 when the diagnosis device is connected to another switch device, the switch device generates a duplicate frame for diagnosis by duplicating the frame to be relayed via a designated communication port among the plurality of communication ports, and outputs the generated duplicate frame for diagnosis from a communication port corresponding to the other switch device,
 the switch device is able to set the priority information to be added to the duplicate frame for diagnosis, separately from the priority information to be added to the frame as the original,
 the switch device outputs the generated duplicate frame for diagnosis from the communication port corresponding to the other switch device, according to the set priority information,
 the switch device generates the duplicate frame for diagnosis to which specific information is added, the specific information including an ID of a VLAN of the diagnosis device and indicating that the duplicate frame for diagnosis should be transmitted to the diagnosis device, and
 the switch device receives the duplicate frame for diagnosis, and performs determination regarding output of the duplicate frame for diagnosis to the communication port corresponding to the diagnosis device among the plurality of communication ports, based on the ID of the VLAN included in the specific information added to the duplicate frame for diagnosis.

REFERENCE SIGNS LIST 1 vehicle
54 communication port
101 switch device
110 switch unit
120 acquisition unit
130 duplication unit
140 determination unit
111 in-vehicle communication device
201 diagnosis device
301 in-vehicle communication system

The invention claimed is:

1. A first switch device used in a vehicle, the first switch device comprising:
a plurality of communication ports;
a switch configured to receive a frame, which has been transmitted from a first function circuit of a plurality of function circuits, the frame including an Identifier (ID) of a first Virtual Local Area Network (VLAN) and first priority information, and relay the frame received by the switch from the first function circuit to a second function circuit of the plurality of function circuits via a designated communication port of the plurality of communication ports, according to the first priority information; and
a duplication circuit configured to, based on a diagnosis device in the vehicle being connected to a second switch device in the vehicle, duplicate the frame received by the switch from the first function circuit, thereby generating a duplicate frame for diagnosis, wherein
the duplication circuit sets second priority information for the duplicate frame for diagnosis, the second priority information being set separately from the first priority information of the original frame, and
the switch outputs the duplicate frame for diagnosis, from a communication port of the plurality of communication ports corresponding to the second switch device connected to the diagnosis device, according to the second priority information.

2. The first switch device according to claim 1, wherein the duplication circuit sets, as the priority information to be added to the duplicate frame for diagnosis, a priority level lower than a priority level indicated by the priority information to be added to the frame as the original.

3. The first switch device according to claim 1, wherein the duplication circuit sets, as the priority information to be added to the duplicate frame for diagnosis, a priority level higher than a priority level indicated by the priority information to be added to the frame as the original.

4. The first switch device according to claim 1, further comprising:
an acquisition circuit configured to acquire connection information that allows recognition of another switch device of a plurality of switch devices to which the diagnosis device is connected, in an in-vehicle network including the plurality of switch devices, wherein
the duplication circuit recognizes that the diagnosis device is connected to the other switch device, based on the connection information acquired by the acquisition unit.

5. The first switch device according to claim 1, wherein the duplication circuit generates the duplicate frame for diagnosis to which specific information indicating that the duplicate frame for diagnosis should be transmitted to the diagnosis device is added.

6. The first switch device according to claim 2, further comprising:
an acquisition circuit configured to acquire connection information that allows recognition of another switch device of a plurality of switch devices to which the diagnosis device is connected, in an in-vehicle network including the plurality of switch devices, wherein
the duplication circuit recognizes that the diagnosis device is connected to the other switch device, based on the connection information acquired by the acquisition unit.

7. The first switch device according to claim 3, further comprising:
an acquisition circuit configured to acquire connection information that allows recognition of another switch device of a plurality of switch devices to which the diagnosis device is connected, in an in-vehicle network including the plurality of switch devices, wherein
the duplication circuit recognizes that the diagnosis device is connected to the other switch device, based on the connection information acquired by the acquisition unit.

8. The first switch device according to claim 2, wherein the duplication circuit generates the duplicate frame for diagnosis to which specific information indicating that the duplicate frame for diagnosis should be transmitted to the diagnosis device is added.

9. The first switch device according to claim 3, wherein the duplication circuit generates the duplicate frame for diagnosis to which specific information indicating that the duplicate frame for diagnosis should be transmitted to the diagnosis device is added.

10. The first switch device according to claim 4, wherein the duplication circuit generates the duplicate frame for diagnosis to which specific information indicating that the duplicate frame for diagnosis should be transmitted to the diagnosis device is added.

11. An in-vehicle communication system used with a vehicle, comprising:
the first switch device, the second switch device; and the diagnosis device according to claim 1.

12. A communication method for a first switch device used in a vehicle,
the first switch device including a plurality of communication ports, the method comprising:
receiving a frame, the frame having been transmitted from a first function circuit of a plurality of function circuits, the frame including an Identifier (ID) of a first Virtual Local Area Network (VLAN) and first priority information, and relaying the frame received by the switch from the first function circuit to a second function circuit of the plurality of function circuits via a designated communication port of the plurality of communication ports, according to the first priority information;
based on a diagnosis device in the vehicle being connected to a second switch device in the vehicle, duplicating the frame received from the first function circuit, thereby generating a duplicate frame for diagnosis, wherein the method further includes setting second priority information for the duplicate frame for diagnosis, the second priority information being set separately from the first priority information of the original frame, and outputting the duplicate frame for diagnosis, from a communication port of the plurality of communication ports corresponding to the diagnosis device, according to the second priority information.

13. A first switch device used in a vehicle, the first switch device comprising:

a plurality of communication ports:

a switch configured to receive a frame, which has been transmitted from a first function circuit of a plurality of function circuits, the frame including an Identifier (ID) of a first Virtual Local Area Network (VLAN) and first priority information, and relay the frame received by the switch from the first function circuit to a second function circuit of the plurality of function circuits via a designated communication port of the plurality of communication ports, according to the first priority information;

a duplication circuit configured to, based on a diagnosis device in the vehicle being connected to a second switch device in the vehicle, duplicate the frame received by the switch from the first function circuit, thereby generating a duplicate frame for diagnosis, wherein the duplication circuit sets second priority information for the duplicate frame for diagnosis, the second priority information being set separately from the first priority information of the original frame, and the switch outputs the duplicate frame for diagnosis, from a communication port of the plurality of communication ports corresponding to the second switch device that is connected to the diagnosis device, according to the second priority information; and a determination circuit configured to determine whether the frame received by the switch is a duplicate frame for diagnosis that was generated by a different switch device in the vehicle, wherein the duplication circuit adds priority information to a second region in the duplicate frame for diagnosis, the second region in the duplicate frame being different from a first region in the frame received by the switch from the first function circuit, based on the frame received by the switch including the second region, the determination circuit determines that the frame is the duplicate frame for diagnosis.

14. A first switch device used in a vehicle, the first switch device comprising:

a plurality of communication ports;

a switch configured to receive a frame, which has been transmitted from a first function circuit of a plurality of function circuits, the frame including an Identifier (ID) of a first Virtual Local Area Network (VLAN) and first priority information, and relay the frame received by the switch from the first function circuit to a second function circuit of the plurality of function circuits via a designated communication port of the plurality of communication ports, according to the first priority information;

a duplication circuit configured to, based on a diagnosis device in the vehicle being connected to a second switch device in the vehicle, duplicate the frame received by the switch from the first function circuit, thereby generating a duplicate frame for diagnosis, wherein the duplication circuit sets second priority information for the duplicate frame for diagnosis, the second priority information being set separately from the first priority information of the original frame, and the switch outputs the duplicate frame for diagnosis, from a communication port of the plurality of communication ports corresponding to the second switch device that is connected to the diagnosis device, according to the second priority information; and a determination circuit configured to determine that the frame received by the switch from the first function circuit is a duplicate frame for diagnosis that was generated by the first function circuit, wherein the ID of the first VLAN and the first priority information is included in a first region of the frame received by the switch from the first function circuit, the duplication circuit adds an ID of a second VLAN and the second priority information to a second region in the duplicate frame for diagnosis, the second region in the duplicate frame being different from the first region in the frame received by the switch from the first function circuit, based on the ID of the second VLAN in the duplicate frame matching an ID of a VLAN to which the diagnosis device belongs, the determination circuit determines that the duplicate frame is to be outputted from the communication port corresponding to the second switch device connected to the diagnosis device, and based on the ID of the second VLAN in the duplicate frame for diagnosis received by the switch not matching the ID of the VLAN to which the diagnosis device belongs, the determination circuit discards the duplicate frame.

\* \* \* \* \*